United States Patent
Qiao et al.

(10) Patent No.: US 11,039,501 B2
(45) Date of Patent: Jun. 15, 2021

(54) CONVERGED CONTROLLER SELECTION METHOD, DEVICE, AND CONVERGED CONTROLLER SELECTION SYSTEM

(71) Applicant: Huawei Technologies Co., Ltd., Shenzhen (CN)

(72) Inventors: Xiaoqiang Qiao, Shenzhen (CN); Yan Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/406,649

(22) Filed: May 8, 2019

(65) Prior Publication Data

US 2019/0268967 A1    Aug. 29, 2019

Related U.S. Application Data

(63) Continuation of application No. PCT/CN2016/105122, filed on Nov. 8, 2016.

(51) Int. Cl.
*H04W 80/10* (2009.01)
*H04W 28/08* (2009.01)
(Continued)

(52) U.S. Cl.
CPC ......... *H04W 80/10* (2013.01); *H04L 12/1403* (2013.01); *H04W 8/26* (2013.01);
(Continued)

(58) Field of Classification Search
CPC ....... H04W 80/10; H04W 8/26; H04W 28/08; H04W 68/005; H04W 88/12;
(Continued)

(56) References Cited

U.S. PATENT DOCUMENTS

2010/0281170 A1   11/2010   Rui et al.
2010/0284336 A1   11/2010   Rui et al.
(Continued)

FOREIGN PATENT DOCUMENTS

CN   101217789 A   7/2008
CN   101227391 A   7/2008
(Continued)

OTHER PUBLICATIONS

3rd Generation Partnership Project;Technical Specification Group Core Network and Terminals; Policy and Charging Control signalling flows and Quality of Service (QoS) parameter mapping (Release 14), 3GPP TS 29.213 V14.1.0 (Sep. 2016), 225 pages.
(Continued)

*Primary Examiner* — Peter P Chau
(74) *Attorney, Agent, or Firm* — Slater Matsil, LLP

(57) ABSTRACT

A method includes: receiving, by a network element selector, a first message from a first external network element, where the first message carries a first session index, and the first session index is used to identify UE served by the first external network element; and sending, by the network element selector, the first message to a first converged controller based on mapping information corresponding to the UE and the first session index in the first message, where the mapping information includes a mapping relationship between the first converged controller and a plurality of different session indexes of the UE, and the plurality of different session indexes of the UE include the first session index. It can be learned that the network element selector sends, based on the mapping information corresponding to the UE, all messages of different external network elements serving the UE to a same converged controller.

8 Claims, 13 Drawing Sheets

(51) Int. Cl.
    *H04W 68/00*    (2009.01)
    *H04W 88/12*    (2009.01)
    *H04W 8/26*     (2009.01)
    *H04L 12/14*    (2006.01)
    H04W 24/04      (2009.01)
    H04L 12/803     (2013.01)
    H04W 88/14      (2009.01)
    H04L 29/12      (2006.01)
    H04W 88/16      (2009.01)

(52) U.S. Cl.
    CPC ......... *H04W 28/08* (2013.01); *H04W 68/005* (2013.01); *H04W 88/12* (2013.01); *H04L 47/125* (2013.01); *H04L 61/2007* (2013.01); *H04L 61/2076* (2013.01); *H04W 24/04* (2013.01); *H04W 88/14* (2013.01); *H04W 88/16* (2013.01)

(58) Field of Classification Search
    CPC ..... H04W 24/04; H04W 88/14; H04W 88/16; H04L 12/1403; H04L 47/125; H04L 61/2076; H04L 61/2007
    See application file for complete search history.

(56) References Cited

U.S. PATENT DOCUMENTS

| | | | | |
|---|---|---|---|---|
| 2010/0291923 | A1* | 11/2010 | Zhou | H04L 12/1407 455/432.1 |
| 2011/0138005 | A1* | 6/2011 | Zhou | H04L 45/02 709/206 |
| 2012/0297076 | A1* | 11/2012 | Wu | H04L 12/1403 709/227 |
| 2016/0227044 | A1 | 8/2016 | Livanos et al. | |
| 2016/0285759 | A1* | 9/2016 | Ryan | H04L 69/22 |
| 2016/0373348 | A1* | 12/2016 | Renzullo | H04L 69/08 |
| 2017/0052777 | A1 | 2/2017 | Oikawa | |

FOREIGN PATENT DOCUMENTS

| | | | |
|---|---|---|---|
| CN | 101541100 A | 9/2009 | |
| CN | 101583114 A | 11/2009 | |
| CN | 102958046 A | 3/2013 | |
| CN | 103139762 A | 6/2013 | |
| CN | 103313344 A | 9/2013 | |
| CN | 105516952 A | 4/2016 | |
| EP | 2495927 A1 | 9/2012 | |
| WO | 2009089776 A1 | 7/2009 | |
| WO | 2009092304 A1 | 7/2009 | |
| WO | 2011110020 A1 | 9/2011 | |
| WO | WO-2012126311 A1 * | 9/2012 | ......... H04L 67/1036 |
| WO | 2015122119 A1 | 8/2015 | |

OTHER PUBLICATIONS

3rd Generation Partnership Project;Technical Specification Group Core Network and Terminals; Study on PCRF failure and restoration (Release 10), 3GPP TR 29.816 V10.0.0 (Sep. 2010), 63 pages.
3rd Generation Partnership Project; Technical Specification Group Services and System Aspects; Policy and charging control architecture (Release 14), 3GPP TS 23.203 V14.1.0 (Sep. 2016), 253 pages.

* cited by examiner

CONVERGED CONTROLLER SELECTION METHOD, DEVICE, AND CONVERGED CONTROLLER SELECTION SYSTEM

CROSS-REFERENCE TO RELATED APPLICATIONS

This application is a continuation of International Application No. PCT/CN2016/105122, filed on Nov. 8, 2016, the disclosure of which is hereby incorporated by reference in its entirety.

TECHNICAL FIELD

The present invention relates to communications technologies, and in particular, to a converged controller selection method, a device, and a converged controller selection system.

BACKGROUND

With development of mobile Internet services, diversification of corporate network services, and convergence of mobile access networks of various standards, there is an increasingly high requirement for a core network architecture.

In traditional system architecture evolution (SAE), there are problems of excessive control network elements and dispersed status information, resulting in excessive control interfaces and interaction signaling in a core network. In addition, this tends to cause control logic conflicts, and reduces overall communication efficiency of a system. Therefore, convergence of control functions and aggregation of status information are required to further simplify a core network architecture and improve network efficiency. In this way, a control convergence oriented core network architecture emerges accordingly.

In the control convergence oriented core-network architecture, an independent network element selector is deployed on a core network side. The network element selector receives interaction signaling sent by different external network elements (for example, a base station, an application function entity (AF), or a gateway user-plane (GW-U)) to various converged controllers, performs selection among a plurality of converged controllers, and evenly allocates signaling load.

Different external network elements use different session indexes. For example, a base station may use a globally unique temporary identity (GUTI) of a user, an application function entity (AF) may use an Internet Protocol (IP) address of a user, and a gateway user-plane (GW-U) may use a GPRS tunneling protocol (GTP) tunnel endpoint identifier (TEID). However, current communication standards have not yet provided a solution about how a network element selector selects a same converged controller when different external network elements use different session indexes in the control convergence oriented core-network architecture. In other words, signaling sent by different external network elements serving same user equipment (UE) cannot be sent to a same converged controller. As a result, signaling requested by the UE cannot be responded correctly, thereby causing relatively poor system performance.

SUMMARY

Embodiments of this application provide a converged controller selection method, a device, and a converged controller selection system, so as to implement consistent selection of a converged controller by a network element selector when different external network elements use different session indexes.

According to a first aspect, an embodiment of this application provides a converged controller selection method. The method includes receiving, by a network element selector, a first message from a first external network element, where the first message carries a first session index, and the first session index is used to identify user equipment (UE) served by the first external network element. The method also includes sending, by the network element selector, the first message to a first converged controller based on mapping information corresponding to the UE and the first session index in the first message, where the mapping information includes a mapping relationship between the first converged controller and a plurality of different session indexes of the UE, and the plurality of different session indexes of the UE include the first session index.

According to the converged controller selection method provided in the first aspect, the network element selector receives the first message carrying the first session index from the first external network element, and sends the first message to the first converged controller based on the mapping information corresponding to the UE and the first session index in the first message, where the mapping information corresponding to the UE includes the mapping relationship between the first converged controller and the plurality of different session indexes of the UE. It can be learned that the network element selector sends, based on the mapping information corresponding to the UE, all messages of different external network elements serving the UE to a same converged controller. This implements consistent selection of the converged controller, ensures a data access hit rate, and implements system performance optimization.

In a possible design, before the receiving, by a network element selector, a first message from a first external network element, the method further includes: receiving, by the network element selector, a second message from a second external network element, where the second message is a message used to provide a service for the UE by the second external network element; and if the second message does not carry a session index of the UE, or if the network element selector does not store the mapping information corresponding to the UE, determining, by the network element selector based on running status information of each converged controller, to send the second message to the first converged controller.

In a possible design, after the determining, by the network element selector based on running status information of each converged controller, to send the second message to the first converged controller, the method further includes: receiving, by the network element selector, a first indication message from the first converged controller, where the first indication message carries an association relationship between the plurality of different session indexes that are assigned by the first converged controller to the UE; and generating, by the network element selector based on the association relationship, the mapping information corresponding to the UE.

According to the converged controller selection method provided in this implementation, the network element selector generates, based on the first indication message sent by the first converged controller, the mapping information corresponding to the UE, so as to ensure that subsequently when other external network elements send messages carrying a session index of the UE to the network element selector, the network element selector sends, based on the mapping information corresponding to the UE and the session index of the UE, all messages of different external network elements serving the UE to the same converged controller, thereby ensuring consistent selection of the converged controller.

In a possible design, after the sending, by the network element selector, the first message to the first converged controller, the method further includes: receiving, by the network element selector, a first update message from the first converged controller, where the first update message carries a second session index; and updating, by the network element selector based on the second session index, the mapping information corresponding to the UE.

According to the converged controller selection method provided in this implementation, the network element selector updates, based on the first update message sent by the first converged controller, the mapping information corresponding to the UE, so as to ensure that subsequently when other external network elements send messages carrying a session index of the UE to the network element selector, the network element selector accurately sends, based on the accurate mapping information corresponding to the UE and the session index of the UE, all messages of different external network elements serving the UE to the same converged controller, thereby ensuring consistent selection of the converged controller.

In a possible design, the converged controller selection method further includes: receiving, by the network element selector, a third message from a third external network element, where the third message is a message used to provide a service for the UE by the third external network element, and the third message carries a third session index; updating, by the network element selector based on running status information of the first converged controller and running status information of another converged controller, the first converged controller in the mapping information corresponding to the UE to a second converged controller; and sending, by the network element selector, the third message to the second converged controller based on the updated mapping information corresponding to the UE and the third session index.

According to the converged controller selection method provided in this implementation, not only load balancing is implemented between converged controllers, but also system reliability is improved. In addition, it is ensured that the network element selector still sends subsequently received messages that are sent by the third external network element or other external network elements and that contain different session indexes of the UE to the same converged controller, implementing consistent selection of the converged controller.

In a possible design, after the sending the third message to the second converged controller based on the updated mapping information corresponding to the UE and the third session index, the method further includes: receiving, by the network element selector, a second update message from the second converged controller, where the second update message carries a fourth session index; and updating, by the network element selector based on the fourth session index, the mapping information corresponding to the UE.

According to the converged controller selection method provided in this implementation, the network element selector updates, based on the second update message sent by the second converged controller, the mapping information corresponding to the UE, so that when the network element selector subsequently receives a message that is sent by another external network element and that contains different session indexes of the UE, the network element selector can still forward the message to the same converged controller based on new mapping information corresponding to the UE, thereby implementing consistent selection of the converged controller.

In a possible design, after the sending, by the network element selector, the first message to the first converged controller, the method further includes: receiving, by the network element selector, a deletion instruction message from the first converged controller, where the deletion instruction message is used for deleting the mapping information corresponding to the UE; and deleting, by the network element selector according to the deletion instruction message, the mapping information corresponding to the UE.

According to the converged controller selection method provided in this implementation, the network element selector can delete, according to the deletion instruction message sent by the converged controller, the mapping information corresponding to the UE, thereby reducing occupation of a storage space by invalid data, and ensuring correctness of subsequent converged controller selection by the network element selector.

According to a second aspect, an embodiment of this application provides a converged controller selection method. The method includes receiving, by a converged controller, a message from a network element selector, where the message is a message sent by an external network element to the network element selector for providing a service for user equipment UE. The method also includes sending, by the converged controller, an operation instruction message to the network element selector based on the message, where the operation instruction message is used for generating, updating, or deleting mapping information corresponding to the UE, and the mapping information corresponding to the UE includes a mapping relationship between the first converged controller and a plurality of different session indexes of the UE.

According to the converged controller selection method provided in the second aspect, the converged controller receives the message sent by the network element selector, sends a corresponding operation instruction message to the network element selector based on the message, and generates, updates, or deletes the mapping information corresponding to the UE or performs another operation. In this way, the network element selector accurately sends, based on the accurate mapping information corresponding to the UE, all messages of different external network elements serving the UE to a same converged controller (that is, implementing consistent selection of the converged controller), thereby ensuring a data access hit rate and implementing system performance optimization.

In a possible design, the operation instruction message carries an association relationship between the plurality of different session indexes that are assigned by the converged controller to the UE.

In a possible design, before the sending, by the converged controller, an operation instruction message to the network element selector based on the message, the method further includes: determining, by the converged controller, whether a session index in the mapping information corresponding to the UE needs to be updated, where if the converged controller determines that a session index in the mapping information corresponding to the UE needs to be updated, the operation instruction message carries the to-be-updated session index in the plurality of different session indexes in the mapping information.

In a possible design, the operation instruction message is used for deleting the mapping information corresponding to the UE.

According to a third aspect, an embodiment of this application provides a converged controller selection method. The method includes receiving, by a converged controller, a message from a network element selector, where the message is a message sent by an external network element to the network element selector for providing a service for user equipment UE. The method also includes determining, by the converged controller, whether the UE is UE that reselects a converged controller. The method also includes determining, by the converged controller, whether a session index in mapping information corresponding to the UE needs to be updated; and if the UE is UE that reselects a converged controller, and a session index in the mapping information corresponding to the UE needs to be updated, sending, by the converged controller, an update message to the network element selector, where the update message is used for updating the mapping information corresponding to the UE, the mapping information corresponding to the UE includes a mapping relationship between the converged controller and a plurality of different session indexes of the UE, and the update message carries the to-be-updated session index in the plurality of different session indexes in the mapping information.

According to the converged controller selection method provided in the third aspect, the converged controller receives the message sent by the network element selector, sends the update message to the network element selector when the converged controller determines that the UE is UE that reselects a converged controller and that a session index in the mapping information corresponding to the UE needs to be updated, and updates the mapping information corresponding to the UE. In this way, the network element selector accurately sends, based on the accurate mapping information corresponding to the UE, all messages of different external network elements serving the UE to a same converged controller (that is, implementing consistent selection of the converged controller), thereby ensuring a data access hit rate and implementing system performance optimization.

According to a fourth aspect, an embodiment of this application provides a network element selector. The network element selector includes a first receiving module, configured to receive a first message from a first external network element, where the first message carries a first session index, and the first session index is used to identify user equipment UE served by the first external network element. The network element selector also includes a first sending module, configured to send the first message to a first converged controller based on mapping information corresponding to the UE and the first session index in the first message, where the mapping information includes a mapping relationship between the first converged controller and a plurality of different session indexes of the UE, and the plurality of different session indexes of the UE include the first session index.

In a possible design, the network element selector further includes: a second receiving module, configured to receive a second message from a second external network element, where the second message is a message used to provide a service for the UE by the second external network element; and a determining module, configured to: if the second message does not carry a session index of the UE, or if the network element selector does not store the mapping information corresponding to the UE, determine, based on running status information of each converged controller, to send the second message to the first converged controller.

In a possible design, the network element selector further includes: a third receiving module, configured to receive a first indication message from the first converged controller, where the first indication message carries an association relationship between the plurality of different session indexes that are assigned by the first converged controller to the UE; and a generation module, configured to generate, based on the association relationship, the mapping information corresponding to the UE.

In a possible design, the network element selector further includes: a fourth receiving module, configured to receive a first update message from the first converged controller, where the first update message carries a second session index; and a first update module, configured to update, based on the second session index, the mapping information corresponding to the UE.

In a possible design, the network element selector further includes: a fifth receiving module, configured to receive a third message from a third external network element, where the third message is a message used to provide a service for the UE by the third external network element, and the third message carries a third session index; a second update module, configured to update, based on running status information of the first converged controller and running status information of another converged controller, the first converged controller in the mapping information corresponding to the UE to a second converged controller; and a second sending module, configured to send the third message to the second converged controller based on the updated mapping information corresponding to the UE and the third session index.

In a possible design, the network element selector further includes: a sixth receiving module, configured to receive a second update message from the second converged controller, where the second update message carries a fourth session index; and a third update module, configured to update, based on the fourth session index, the mapping information corresponding to the UE.

In a possible design, the network element selector further includes: a seventh receiving module, configured to receive a deletion instruction message from the first converged controller, where the deletion instruction message is used for deleting the mapping information corresponding to the UE; and a deletion module, configured to delete, according to the deletion instruction message, the mapping information corresponding to the UE.

For beneficial effects of the network element selector provided in the fourth aspect and the possible implementations of the fourth aspect, reference may be made to the beneficial effects brought by the possible implementations of the first aspect. Details are not described herein again.

According to a fifth aspect, an embodiment of the present invention provides a converged controller. The converged controller includes a receiving module, configured to receive a message from a network element selector, where the message is a message sent by an external network element to the network element selector for providing a service for user equipment UE. The converged controller also includes a sending module, configured to send an operation instruction message to the network element selector based on the message, where the operation instruction message is used for generating, updating, or deleting mapping information corresponding to the UE, and the mapping information corresponding to the UE includes a mapping relationship between the first converged controller and a plurality of different session indexes of the UE.

In a possible design, the operation instruction message carries an association relationship between the plurality of different session indexes that are assigned by the converged controller to the UE.

In a possible design, the converged controller further includes: a judging module, configured to determine whether a session index in the mapping information corresponding to the UE needs to be updated, where if the judging module determines that a session index in the mapping information corresponding to the UE needs to be updated, the operation instruction message carries the to-be-updated session index in the plurality of different session indexes in the mapping information.

In a possible design, the operation instruction message is used for deleting the mapping information corresponding to the UE.

For beneficial effects of the converged controller provided in the fifth aspect and the possible implementations of the fifth aspect, reference may be made to the beneficial effects brought by the possible implementations of the second aspect. Details are not described herein again.

According to a sixth aspect, an embodiment of the present invention provides a converged controller. The converged controller includes a receiving module, configured to receive a message from a network element selector, where the message is a message sent by an external network element to the network element selector for providing a service for user equipment (UE). The converged controller also includes a first judging module, configured to determine whether the UE is UE that reselects a converged controller. The converged controller also includes a second judging module, configured to determine whether a session index in mapping information corresponding to the UE needs to be updated. The converged controller also includes a sending module, configured to: if the first judging module determines that the UE is UE that reselects a converged controller, and the second judging module determines that a session index in the mapping information corresponding to the UE needs to be updated, send an update message to the network element selector, where the update message is used for updating the mapping information corresponding to the UE, the mapping information corresponding to the UE includes a mapping relationship between the converged controller and a plurality of different session indexes of the UE, and the update message carries the to-be-updated session index in the plurality of different session indexes in the mapping information.

For beneficial effects of the converged controller provided in the sixth aspect and the possible implementations of the sixth aspect, reference may be made to the beneficial effects brought by the possible implementations of the third aspect. Details are not described herein again.

According to a seventh aspect, an embodiment of this application provides a converged controller selection system, including: the network element selector according to any implementation of the fourth aspect, and the converged controller according to any implementation of the fifth aspect.

Optionally, the converged controller selection system further includes the converged controller according to the sixth aspect.

According to an eighth aspect, an embodiment of this application provides a mapping information generation method. The method includes receiving, by a network element selector, an operation instruction message from a converged controller, where the operation instruction message carries an association relationship between a plurality of different session indexes that are assigned by the controller to user equipment UE. The method also includes generating, by the network element selector based on the association relationship, mapping information corresponding to the UE, where the mapping information corresponding to the UE includes a mapping relationship between the converged controller and the plurality of different session indexes of the UE.

According to the mapping information generation method provided in the eighth aspect, the network element selector generates, based on the operation instruction message sent by the converged controller, the mapping information corresponding to the UE, so as to ensure that subsequently when other external network elements send messages carrying a session index of the UE to the network element selector, the network element selector sends, based on the mapping information corresponding to the UE and the session index of the UE, all messages of different external network elements serving the UE to a same converged controller, thereby ensuring consistent selection of the converged controller.

According to a ninth aspect, an embodiment of this application provides a network element selector. The network element selector includes a receiving module, configured to receive an operation instruction message from a converged controller, where the operation instruction message carries an association relationship between a plurality of different session indexes that are assigned by the controller to user equipment UE. The network element selector also includes a generation module, configured to generate, based on the association relationship, mapping information corresponding to the UE, where the mapping information corresponding to the UE includes a mapping relationship between the converged controller and the plurality of different session indexes of the UE.

For beneficial effects of the network element selector provided in the ninth aspect, reference may be made to the beneficial effects brought by the implementation of the eighth aspect. Details are not described herein again.

BRIEF DESCRIPTION OF THE DRAWINGS

To describe the technical solutions in the embodiments of the present invention or in the prior art more clearly, the following briefly describes the accompanying drawings required for describing the embodiments or the prior art.

DETAILED DESCRIPTION OF ILLUSTRATIVE EMBODIMENTS

In the specification, claims, and accompanying drawings of the present invention, the terms "first", "second", and so on are intended to distinguish between similar objects but do not necessarily indicate a specific order or sequence. It should be understood that the data termed in such a way are interchangeable in proper circumstances so that the embodiments of the present invention described herein can be implemented in an order other than the order illustrated or described herein. Moreover, the terms "include", "contain" and any other variants mean to cover the non-exclusive inclusion, for example, a process that includes a list of steps, a method, a system that includes a plurality of units or modules, a product, or a device is not necessarily limited to those steps or units, but may include other steps or units not expressly listed or inherent to such a process, method, product, or device. "At least one" in the present invention means one or more.

First, a control convergence oriented core network architecture in the embodiments of this application is described in detail.

Figure 1:
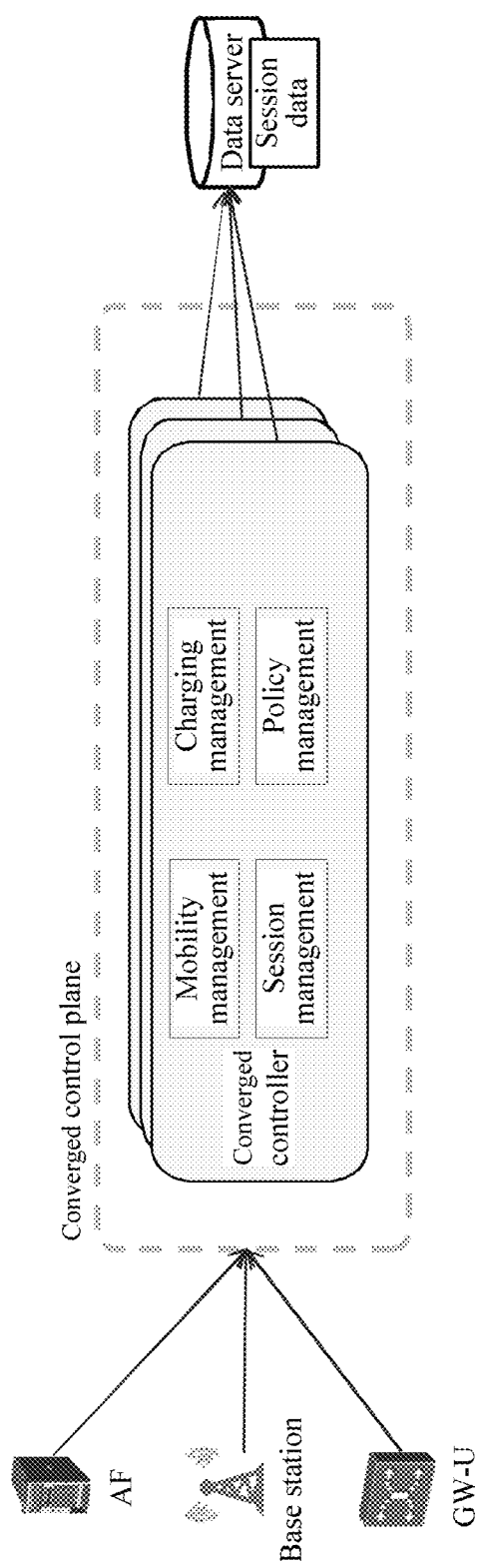
FIG. 1 is a schematic diagram of a control convergence oriented core network architecture.

FIG. 1 is a schematic diagram of a control convergence oriented core network architecture. The core network architecture shown in FIG. 1 has the following characteristics: (1) A converged controller contains functions of a traditional core-network control network element (for example, including mobility management, session management, charging management, and policy management); (2) A network functions virtualization (NFV) technology is used to implement flexible scaling and dynamic deployment of the converged controller; and (3) Service status data and service control logic are decoupled, and stored and managed in a centralized manner.

Second, several terms in the embodiments of this application and network elements in the present invention are explained.

(1) Load Balancing

Figure 2:
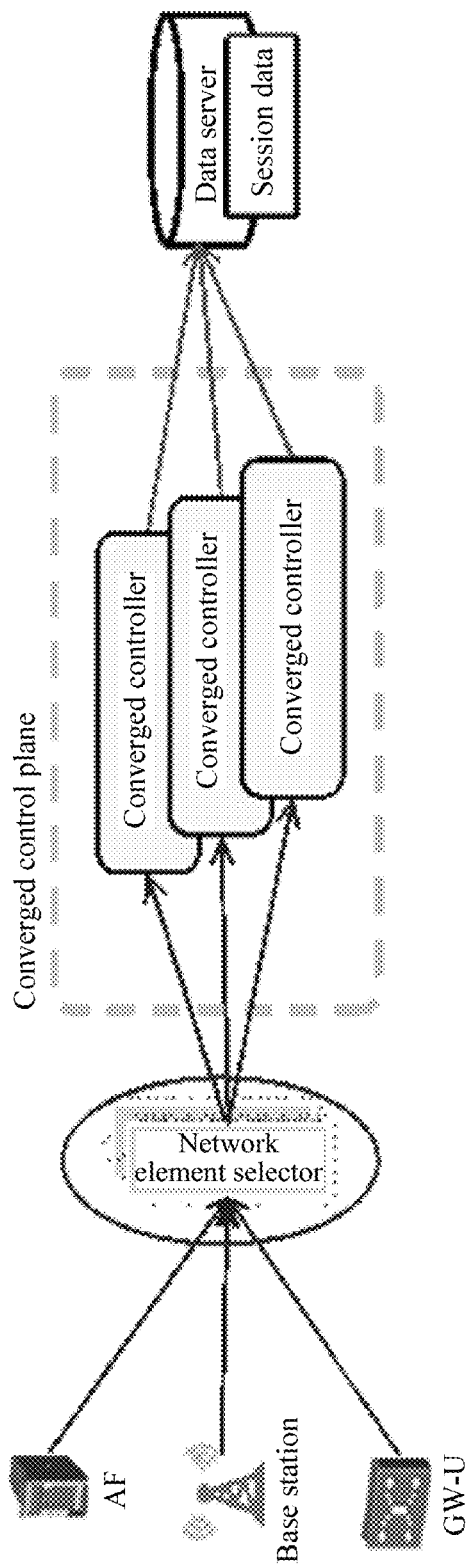
FIG. 2 is a schematic diagram of load balancing of a converged control plane based on an independent network element selector.

A load balancing technology is a key technology in a cluster system. FIG. 2 is a schematic diagram of load balancing of a converged control plane based on an independent network element selector. As shown in FIG. 2, an independent network element selector is deployed on a core network side. The network element selector receives signaling sent by different external network elements to various converged controllers. For example, the external network elements may include a base station, an AF, or a GW-U. Certainly, the external network element may alternatively be another network element. This is not limited in the embodiments of this application. Based on a configured balancing policy, the network element selector distributes, in a converged controller cluster, signaling sent by different external network elements to various converged controllers. The network element selector may also maintain availability of the converged controllers. A primary objective of load balancing is to evenly allocate workload through task scheduling, and optimize resource utilization and a task response time, so as to minimize communication overheads between processes. If a converged controller is faulty, the network element selector can detect the situation in a timely manner, and allocate new signaling to a normally working converged controller, so as to prevent a failure of the converged controller from affecting normal operation of an enterprise. In addition, a quantity of converged controllers can be increased or decreased in real time based on an actual service access amount, implementing dynamic scaling of resources. Therefore, the load balancing technology effectively ensures reliability and scalability of an application service.

(2) Session Persistence

In most enterprise-level applications and e-commerce application systems, a client and a converged controller usually need to perform a plurality of interaction processes to complete one transaction or one service. On one hand, these interactions are closely related to a user identity; on the other hand, when performing a step of the interaction processes, the converged controller needs to know a processing result of a previous interaction process or results of previous several interaction processes. Therefore, application requests that are sent by different external network elements and that are related to a client need to be forwarded to a same converged controller, instead of being forwarded by the network element selector to different converged controllers for processing. To meet the foregoing requirements, the network element selector needs to identify association of interaction processes between the client and the converged controller, so that during load balancing, a series of associated application requests of a same client are allocated to the same converged controller. Such a mechanism is referred to as session persistence.

Some Network Elements in this Application:

User equipment (UE): User equipment may also be referred to as a user terminal. The UE in the embodiments of this application includes but is not limited to a mobile phone, an intelligent terminal, a multimedia device, and a streaming media device.

Base station: A base station may be a device that communicates with a wireless terminal over an air interface in an access network by using one or more sectors, and is responsible for all air interface-related functions. For example, the base station may be a base transceiver station (BTS) in GSM or CDMA, may be a NodeB (NodeB) in WCDMA, may be an evolved NodeB (eNB or e-NodeB, evolved NodeB) in LTE, or may be a transmission reception point (TRP). This is not limited in the embodiments of this application.

Converged controller: A converged controller is a control network element in the core-network architecture, integrates a plurality of control functions of a core network, and is responsible for processing related signaling, for example, mobility management, session management, policy management, and charging management.

Network element selector (NES): A network element selector is responsible for converged controller selection, load balancing, session persistence, and the like.

Figure 3:
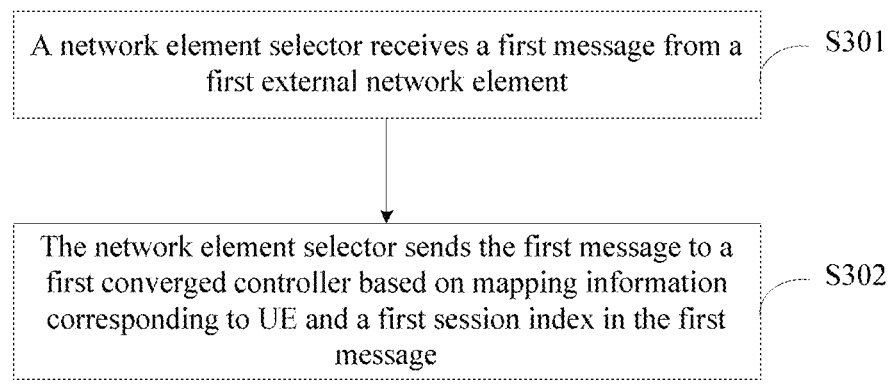
FIG. 3 shows a flowchart of an embodiment of a converged controller selection method according to this application.

FIG. 3 shows a flowchart of an embodiment of a converged controller selection method according to this application. As shown in FIG. 3, the method according to this embodiment may include the following steps.

S301: A network element selector receives a first message from a first external network element.

The first message carries a first session index, and the first session index is used to identify UE served by the first external network element. For example, for a different external network element, a different session index of the UE is carried in the first message. For example, if an external network element is a GW-U, a session index of the UE that is carried in the first message sent by the GW-U to the network element selector is a TEID; if the external network element is an AF, a session index of the UE that is carried in the first message sent by the AF to the network element selector is an IP address of the UE; and if the external network element is a base station, a session index of the UE that is carried in the first message sent by the base station to the network element selector is a GUTI.

Optionally, the first message may be an attach request message, a connection establishment request message, or the like. Certainly, the first message may alternatively be another message. This is not limited in this embodiment of this application.

S302: The network element selector sends the first message to a first converged controller based on mapping information corresponding to the UE and a first session index in the first message.

The mapping information corresponding to the UE includes a mapping relationship between the first converged controller and a plurality of different session indexes of the UE, and the plurality of different session indexes of the UE include the first session index.

In this step, optionally, the network element selector determines, based on the mapping information corresponding to the UE and the first session index in the first message, a converged controller (referred to as the first converged controller in this application for ease of description) corresponding to the first session index in the mapping information corresponding to the UE as a converged controller configured to serve the UE, and sends the first message to the first converged controller. Optionally, a format of the mapping information may be a mapping relationship table, and certainly may alternatively be another format. This is not limited in this embodiment of this application.

Figure 4:
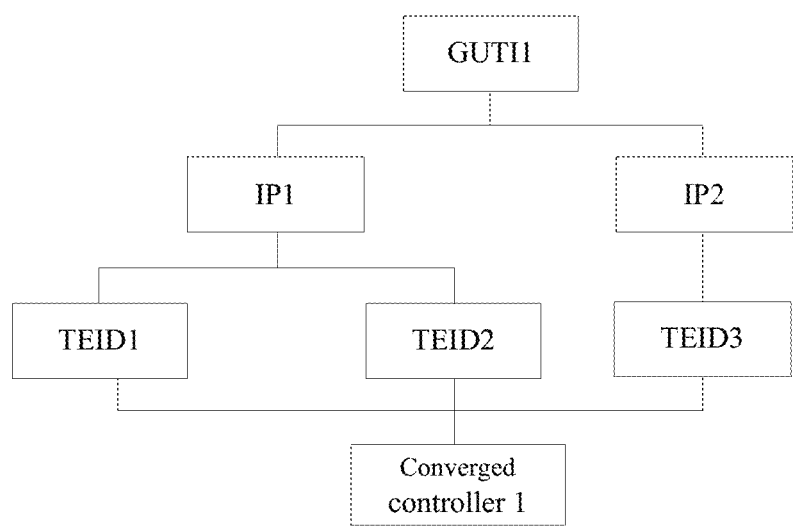
FIG. 4 is a schematic diagram of mapping information corresponding to UE1 according to this application.

FIG. 4 is a schematic diagram of mapping information corresponding to UE1 according to this application. In an example of FIG. 4, session indexes of UE1 corresponding to a converged controller 1 include GUTI1, IP1, IP2, TEID1, TEID2, and TEID3. Assuming that an external network element sending a first message is a base station, and a session index of UE1 that is carried in the first message is GUTI1, the network element selector determines, based on mapping information corresponding to UE1 and the session index (namely, GUTI1) of UE1, a converged controller (namely, the converged controller 1) corresponding to GUTI1 in the mapping information corresponding to UE1 as a converged controller configured to serve the UE.

In this embodiment of this application, mapping information corresponding to each UE includes a mapping relationship between a converged controller serving the UE and a plurality of corresponding different session indexes. Therefore, the network element selector sends, based on the mapping information corresponding to the UE, all messages of different external network elements serving the UE to a same converged controller.

Figure 5:
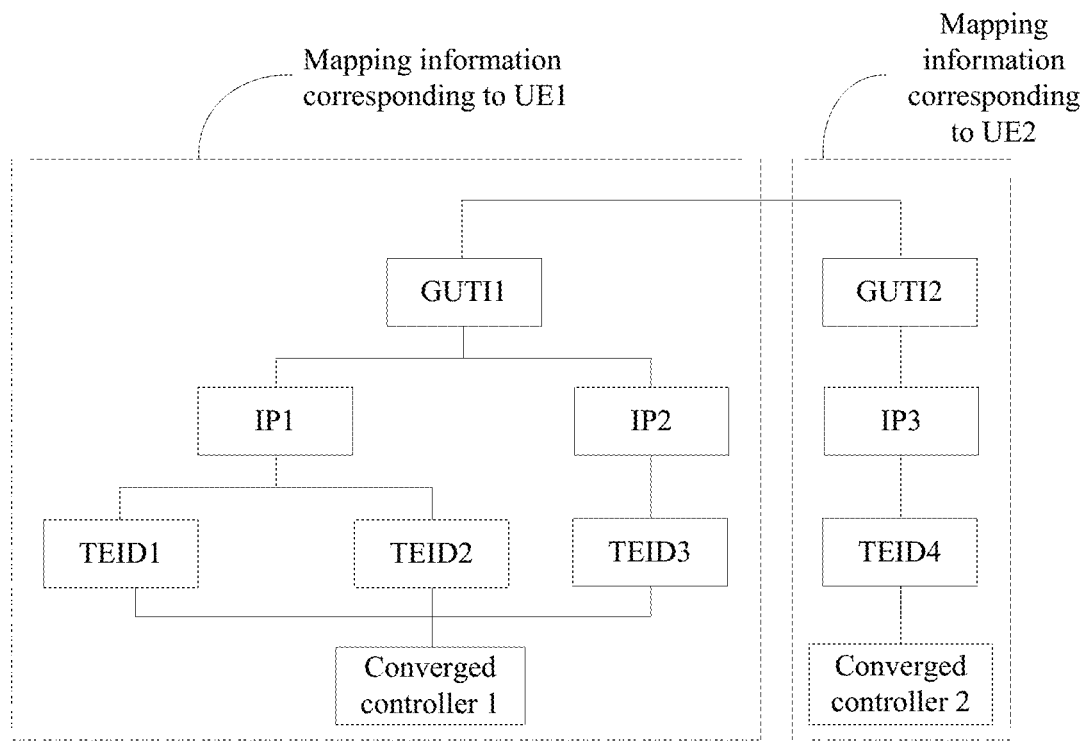
FIG. 5 is a schematic diagram of mapping information corresponding to UE1 and UE2 according to this application.

For example, FIG. 5 is a schematic diagram of mapping information corresponding to UE1 and UE2 according to this application. As shown in FIG. 5, a session index of UE1 during interaction between UE1 and a base station is GUTI1, a session index of UE1 during interaction between UE1 and AF1 is IP1, a session index of UE1 during interaction between UE1 and AF2 is IP2, a session index of UE1 during interaction between UE1 and GW-U1 is TEID1, a session index of UE1 during interaction between UE1 and GW-U2 is TEID2, a session index of UE1 during interaction between UE1 and GW-U3 is TEID3, and all the foregoing session indexes of UE1 correspond to a converged controller 1. After receiving a first message that is sent by any one of the foregoing external network elements and that is related to UE1, the network element selector sends the first message to the converged controller 1 based on the session index of UE1 carried in the first message and the mapping information corresponding to UE1, so that the converged controller 1 processes the first message. This ensures that messages of different external network elements serving UE1 are all sent to the converged controller 1, and implements consistent selection of the converged controller.

For another example, a session index of UE2 during interaction between UE2 and a base station is GUTI2, a session index of UE2 during interaction between UE2 and AF1 is IP3, a session index of UE2 during interaction between UE2 and a GW-U is TEID4, and all the foregoing session indexes of UE2 correspond to a converged controller 2. After receiving a first message that is sent by any one of the foregoing external network elements and that is related to UE2, the network element selector sends the first message to the converged controller 2 based on the session index of UE2 carried in the first message and the mapping information corresponding to UE2, so that the converged controller 2 processes the first message. This ensures that messages of different external network elements serving UE2 are all sent to the converged controller 2, and implements consistent selection of the converged controller.

In this embodiment, although session indexes of UE that are carried in first messages sent by different external network elements to a gateway selector are different, the network element selector can send the first messages to the first converged controller based on the mapping information and the session indexes of the UE that are carried in the first messages, where the mapping information corresponding to the UE includes a mapping relationship between the first converged controller and the plurality of different session indexes of the UE. Therefore, the network element selector sends, based on the mapping information corresponding to the UE, all messages of different external network elements serving the UE to the same converged controller. This implements consistent selection of the converged controller, ensures a data access hit rate, and implements system performance optimization.

Optionally, before step S301, the method further includes: receiving, by the network element selector, a second message from a second external network element; and if the second message does not carry a session index of the UE, or if the network element selector does not store the mapping information corresponding to the UE, determining, by the network element selector based on running status information of each converged controller, to send the second message to the first converged controller.

In this embodiment of this application, the network element selector receives the second message from the second external network element. The second external network element provides a service for the UE by using the second message (that is, the second message is a message used to provide a service for the UE by the second external network element). Optionally, the second message may be an attach request message. Certainly, the second message may alternatively be another message. This is not limited in this embodiment of this application. Optionally, the second external network element and the first external network element may be a same external network element or different external network elements. This is not limited in this embodiment of this application.

Further, the network element selector can determine whether the second message carries a session index of the UE, and/or determine whether the network element selector stores the mapping information corresponding to the UE. If the second message does not carry a session index of the UE, or if the network element selector does not store the mapping information corresponding to the UE, the network element selector determines, based on running status information of each converged controller, to send the second message to the first converged controller. Optionally, an execution sequence of "the network element selector determines whether the second message carries a session index of the UE" and "the network element selector determines whether the network element selector stores the mapping information corresponding to the UE" is not limited in this embodiment of this application. Once determining "the second message does not carry a session index of the UE" or "the network element selector does not store the mapping information corresponding to the UE", the network element selector determines, based on the running status information of each converged controller, to send the second message to the first converged controller. Optionally, running status information of a converged controller may include but is not limited to information about whether the converged controller is available, and load information of the converged controller.

Optionally, the network element selector determines whether the second message carries a session index of the UE:

(1a) If the second message carries a session index of the UE, the network element selector determines whether the network element selector has already stored the mapping information corresponding to the UE; and if the network element selector does not store the mapping information corresponding to the UE, the network element selector determines, based on the running status information of each converged controller, a converged controller (such as the first converged controller) configured to process the second message, and sends the second message to the first converged controller.

(1b) Alternatively, if the second message does not carry a session index of the UE, the network element selector sends the second message to the first converged controller based on the running status information of each converged controller.

Further, after the determining, by the network element selector based on running status information of each converged controller, to send the second message to the first converged controller, the method further includes: receiving, by the network element selector, a first indication message from the first converged controller, where the first indication message carries an association relationship between the plurality of different session indexes that are assigned by the first converged controller to the UE. For example, the first indication message carries an association relationship between a user GUTI (a session index on a base station side) assigned by the first converged controller to the UE, an IP address (a session index on an AF side) corresponding to a newly established PDN connection, and a user identifier TEID (a session index on a GW-U side) of a user plane. Optionally, the first indication message may further carry other information (such as a mapping relationship between a plurality of different session indexes of another UE and a corresponding target converged controller). This is not limited in this embodiment of this application.

After receiving the first indication message, the network element selector generates, based on the association relationship carried in the first indication message, the mapping information corresponding to the UE.

For example, the mapping information includes a mapping relationship table used to indicate the association relationship between the plurality of different session indexes of the UE. The network element selector can establish the mapping relationship table to generate the mapping information corresponding to the UE. Optionally, if the first indication message further carries an association relationship between a plurality of different session indexes of other UEs and corresponding target converged controllers, the network element selector establishes, based on a mapping relationship between a plurality of different session indexes of each of the other UEs and a corresponding target converged controller, a mapping relationship table corresponding to each UE, to generate mapping information corresponding to the UE.

Optionally, after step S302, the method may further include: receiving, by the network element selector, a first update message from the first converged controller, where the first update message carries a second session index. For example, the first update message includes a to-be-updated session index in the plurality of different session indexes in the mapping information corresponding to the UE. Optionally, the first update message is sent after the first converged controller determines that a session index in the mapping information corresponding to the UE needs to be updated. For example, if the first message is a PDN connection establishment request message, the first converged controller establishes a new PDN connection for the UE (that is, to assign a new IP address 1 and a user identifier TEID1 of a new user plane). In this case, an old session index IP address 2 and a user identifier TEID2 of the user plane in the mapping information need to be updated to the newly assigned IP address 1 and the user identifier TEID1 of the new user plane. Alternatively, if the first message is a PDN connection release message, the first converged controller needs to delete an IP address 2 and a user identifier TEID2 of a user plane that are corresponding to a PDN connection requested to be released. In this case, a session index that needs to be deleted from the mapping information is the IP address 2 and the user identifier TEID2.

After receiving the first update message, the network element selector updates, based on the second session index, the mapping information corresponding to the UE. For example, the network element selector may use the second session index (such as the IP address 1) to replace an old session index (such as the IP address 2) that is already stored in the mapping information corresponding to the UE and that is corresponding to the second session index, or delete the old session index (namely, the second session index) from the mapping information corresponding to the UE.

Optionally, the converged controller selection method further includes: receiving, by the network element selector, a third message from a third external network element, where the third message is a message used to provide a service for the UE by the third external network element, and the third message carries a third session index; updating, by the network element selector based on running status information of the first converged controller and running status information of another converged controller (such as the second converged controller), the first converged controller in the mapping information corresponding to the UE to a second converged controller; and sending, by the network element selector, the third message to the second converged controller based on the updated mapping information corresponding to the UE and the third session index.

Optionally, the network element selector first determines, based on the mapping information corresponding to the UE and the third session index of the UE that is carried in the third message, that a converged controller serving the UE is the first converged controller. Optionally, the third session index may be the same as or different from the first session index. Then, the network element selector determines, based on the running status information of the first converged controller, whether the converged controller needs to be updated. If the converged controller needs to be updated (for example, load of the first converged controller exceeds a threshold, or the first converged controller is unavailable), the network element selector can determine, based on the running status information of the another converged controller and a preset policy, to update the first converged controller in the mapping information corresponding to the UE to the second converged controller. Further, the network element selector sends the third message to the second converged controller based on the updated mapping information corresponding to the UE and the third session index. Optionally, the third external network element may be the same as or different from the first external network element, and the third external network element provides a service for the UE by using the third message. According to this method, load balancing is implemented between converged controllers, system reliability improves, and it is ensured that the network element selector always sends subsequently received messages that contain different session indexes of the UE and that are sent by the third external network element or other external network elements to the same converged controller, implementing consistent selection of the converged controller.

Optionally, after receiving the third message sent by the network element selector, the second converged controller determines whether the UE is UE that reselects a converged controller, and determines whether a session index in the mapping information corresponding to the UE needs to be updated. The UE that reselects a converged controller is UE that is served by another converged controller different from the second converged controller before the UE is served by the second converged controller. Optionally, the second converged controller can determine, by determining whether a converged controller identifier contained in the third session index (such as a GUTI) is an identifier of the second converged controller, whether the UE is UE that reselects a converged controller. Alternatively, the second converged controller can determine, by determining whether the second converged controller stores context information of the UE, whether the UE is UE that reselects a converged controller. Certainly, the second converged controller can determine, in another manner, whether the UE is UE that reselects a converged controller. This is not limited in this embodiment of this application.

Optionally, the second converged controller determines whether a session index in the mapping information corresponding to the UE is associated with the converged controller, so as to determine whether the session index in the mapping information corresponding to the UE needs to be updated.

For example, if the session index is a GUTI and a GUTI reassignment process may be initiated, the second converged controller determines that the session index is associated with the second converged controller, and thereby determines that the session index in the mapping information corresponding to the UE needs to be updated. If an AF side uses an IP address as a session index, a new IP address does not need to be reassigned when a converged controller is replaced. Therefore, the second converged controller determines that the session index is not associated with the converged controller, and thereby determines that the session index in the mapping information corresponding to the UE does not need to be updated. If a base station side uses a GUTI as a session index, and GUTI sharing is implemented between converged controllers, to be specific, no GUTI reassignment process is initiated, the second converged controller determines that the session index is not associated with the converged controller, and thereby determines that the session index in the mapping information corresponding to the UE does not need to be updated.

If the UE is UE that reselects a converged controller (for example, the converged controller identifier contained in the third session index is not the identifier of the second converged controller, or the second converged controller does not locally store the context information of the UE), and it is determined that the session index in the mapping information corresponding to the UE needs to be updated, the second converged controller sends a second update message to the network element selector, where the second update message is used for updating the mapping information corresponding to the UE, and the second update message carries a fourth session index. For example, the fourth session index is a to-be-updated session index in the plurality of different session indexes in the mapping information corresponding to the UE, such as an assigned new GUTI.

Optionally, after receiving the second update message sent by the second converged controller, the network element selector updates, based on the fourth session index in the second update message, the mapping information corresponding to the UE.

For example, the network element selector uses the fourth session index to replace an old session index that is already stored in the mapping information corresponding to the UE and that is corresponding to the fourth session index, or deletes the fourth session index from the mapping information corresponding to the UE.

Optionally, the fourth session index may be sent explicitly or implicitly. For example, if the base station side uses the GUTI as the session index, in a GUTI reassignment process, the second converged controller may explicitly send a GUTI reassignment command message to the UE, where the GUTI reassignment command message is used as the second update message and carries a reassigned new GUTI that is used as the fourth session index. Alternatively, the second converged controller implicitly adds a reassigned new GUTI to a response message (such as a tracking area update accept (TAU Accept) message) that is used as the second update message.

Optionally, after step S302, the method further includes: receiving, by the network element selector, a deletion instruction message from the first converged controller; and deleting, by the network element selector according to the deletion instruction message, the mapping information corresponding to the UE.

For example, in a detach scenario, the network element selector can delete, according to the deletion instruction message sent by the converged controller, the mapping information corresponding to the UE, thereby reducing occupation of a storage space by invalid data, and ensuring correctness of subsequent converged controller selection by the network element selector.

Figure 6:
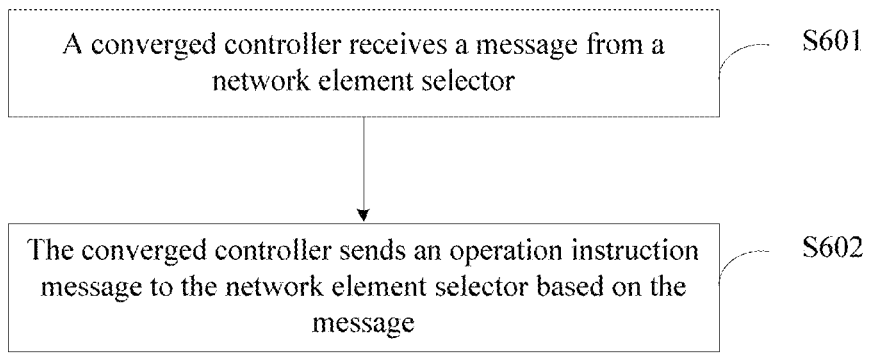
FIG. 6 shows a flowchart of another embodiment of a converged controller selection method according to this application.

FIG. 6 shows a flowchart of another embodiment of a converged controller selection method according to this application. A converged controller in this embodiment can implement functions of the first converged controller in the foregoing embodiments. As shown in FIG. 6, the method according to this embodiment may include the following steps.

S601: A converged controller receives a message from a network element selector.

Optionally, the message is a message sent by an external network element to the network element selector for providing a service for user equipment (UE) (that is, the message is a message used to provide a service for the UE by the external network element).

Optionally, the converged controller may be the first converged controller, and the external network element may be the first external network element, the second external network element, another external network element, or the like.

S602: The converged controller sends an operation instruction message to the network element selector based on the message.

The operation instruction message is used for generating, updating, or deleting mapping information corresponding to the UE. The mapping information corresponding to the UE includes a mapping relationship between the converged controller and a plurality of different session indexes of the UE.

Optionally, if the message is the second message, the operation instruction message is the first indication message. The first indication message is used for establishing the mapping information corresponding to the UE, and the first indication message carries an association relationship between the plurality of session indexes that are assigned by the converged controller to the UE. For a specific implementation, reference may be made to the foregoing related content about the network element selector side in this application. Details are not described herein again.

Optionally, if the message is the first message, before step S602, the method further includes: determining, by the converged controller, whether a session index in the mapping information corresponding to the UE needs to be updated.

If the converged controller determines that a session index in the mapping information corresponding to the UE needs to be updated, the operation instruction message is the first update message. The first update message is used for updating the mapping information corresponding to the UE, and the first update message carries a second session index (including the to-be-updated session index in the plurality of session indexes in the mapping information corresponding to the UE). For a specific implementation, reference may be made to the foregoing related content about the network element selector side in this application. Details are not described herein again.

Optionally, if the message is the first message, the operation instruction message is the deletion instruction message. The deletion instruction message is used for deleting the mapping information corresponding to the UE. For a specific implementation, reference may be made to the foregoing related content about the network element selector side in this application. Details are not described herein again.

In this embodiment of this application, the converged controller receives the message sent by the network element selector, sends a corresponding operation instruction message to the network element selector based on the message, and generates, updates, or deletes the mapping information corresponding to the UE or performs another operation. In this way, the network element selector accurately sends, based on the accurate mapping information corresponding to the UE, all messages of different external network elements serving the UE to a same converged controller (that is, implementing consistent selection of the converged controller), thereby ensuring a data access hit rate and implementing system performance optimization.

In an embodiment of a mapping information generation method according to this application, the method may include: receiving, by a network element selector, an operation instruction message from a converged controller, where the operation instruction message carries an association relationship between a plurality of different session indexes that are assigned by the controller to user equipment UE; and generating, by the network element selector based on the association relationship, mapping information corresponding to the UE, where the mapping information corresponding to the UE includes a mapping relationship between the converged controller and the plurality of different session indexes of the UE.

For a specific implementation, reference may be made to the foregoing content related to "After receiving the first indication message, the network element selector generates, based on the association relationship carried in the first indication message, the mapping information corresponding to the UE" in this application. Details are not described herein again.

In this embodiment of this application, the network element selector generates, based on the operation instruction message sent by the converged controller, the mapping information corresponding to the UE, so as to ensure that subsequently when other external network elements send messages carrying a session index of the UE to the network element selector, the network element selector sends, based on the mapping information corresponding to the UE and the session index of the UE, all messages of different external network elements serving the UE to the same converged controller, thereby ensuring consistent selection of the converged controller.

Figure 7:
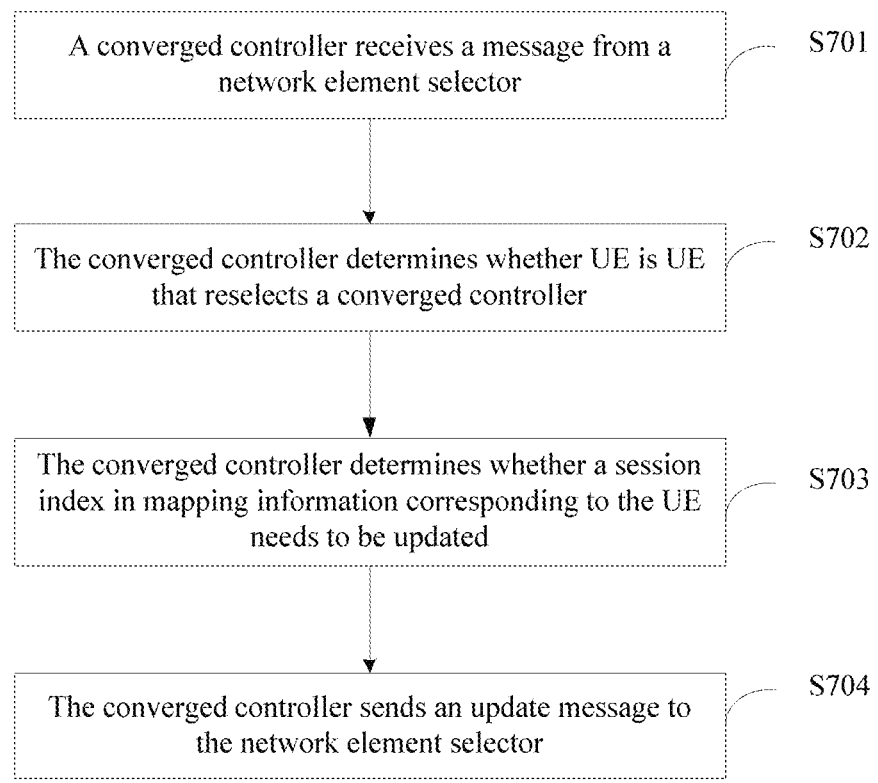
FIG. 7 shows a flowchart of another embodiment of a converged controller selection method according to this application.

FIG. 7 shows a flowchart of another embodiment of a converged controller selection method according to this application. A converged controller in this embodiment can implement functions of the second converged controller in the foregoing embodiments. As shown in FIG. 7, the method according to this embodiment may include the following steps:

S701: A converged controller receives a message from a network element selector.

Optionally, the message is a message sent by an external network element to the network element selector for providing a service for user equipment UE (that is, the message is a message used to provide a service for the UE by the external network element).

Optionally, the converged controller may be the second converged controller, the external network element may be the third external network element, and the message may be the third message.

S702: The converged controller determines whether the UE is UE that reselects a converged controller.

In this step, for a specific implementation about "the converged controller determines whether the UE is UE that reselects a converged controller", reference may be made to the foregoing related content about the network element selector side in this application. Details are not described herein again.

S703: The converged controller determines whether a session index in mapping information corresponding to the UE needs to be updated.

In this step, for a specific implementation about "the converged controller determines whether a session index in the mapping information corresponding to the UE needs to be updated", reference may be made to the foregoing related content about the network element selector side in this application. Details are not described herein again. If it is determined in step S702 that the UE is UE that reselects a converged controller, and it is determined in step S703 that a session index in the mapping information corresponding to the UE needs to be updated, step S704 is performed.

Optionally, an execution sequence of step S702 and step S703 is not limited in this embodiment of this application. Once it is determined that the UE is UE that reselects a converged controller, and that a session index in the mapping information corresponding to the UE needs to be updated, step S704 is performed. For example, step S702 is performed first. If the UE is UE that reselects a converged controller, step S703 is performed.

S704: The converged controller sends an update message to the network element selector.

Optionally, the update message may be the second update message. The update message is used for updating the mapping information (including a mapping relationship between the converged controller and a plurality of session indexes of the UE) corresponding to the UE, and the update message carries a fourth session index (including the to-be-updated session index in the plurality of session indexes in the mapping information corresponding to the UE), so that the network element selector updates, based on the update message, the mapping information corresponding to the UE.

In this embodiment of this application, the converged controller receives the message sent by the network element selector, sends the update message to the network element selector when the converged controller determines that the UE is UE that reselects a converged controller and that a session index in the mapping information corresponding to the UE needs to be updated, and updates the mapping information corresponding to the UE. In this way, the network element selector accurately sends, based on the accurate mapping information corresponding to the UE, all messages of different external network elements serving the UE to the same converged controller (that is, implementing consistent selection of the converged controller), thereby ensuring a data access hit rate and implementing system performance optimization.

Figure 8:
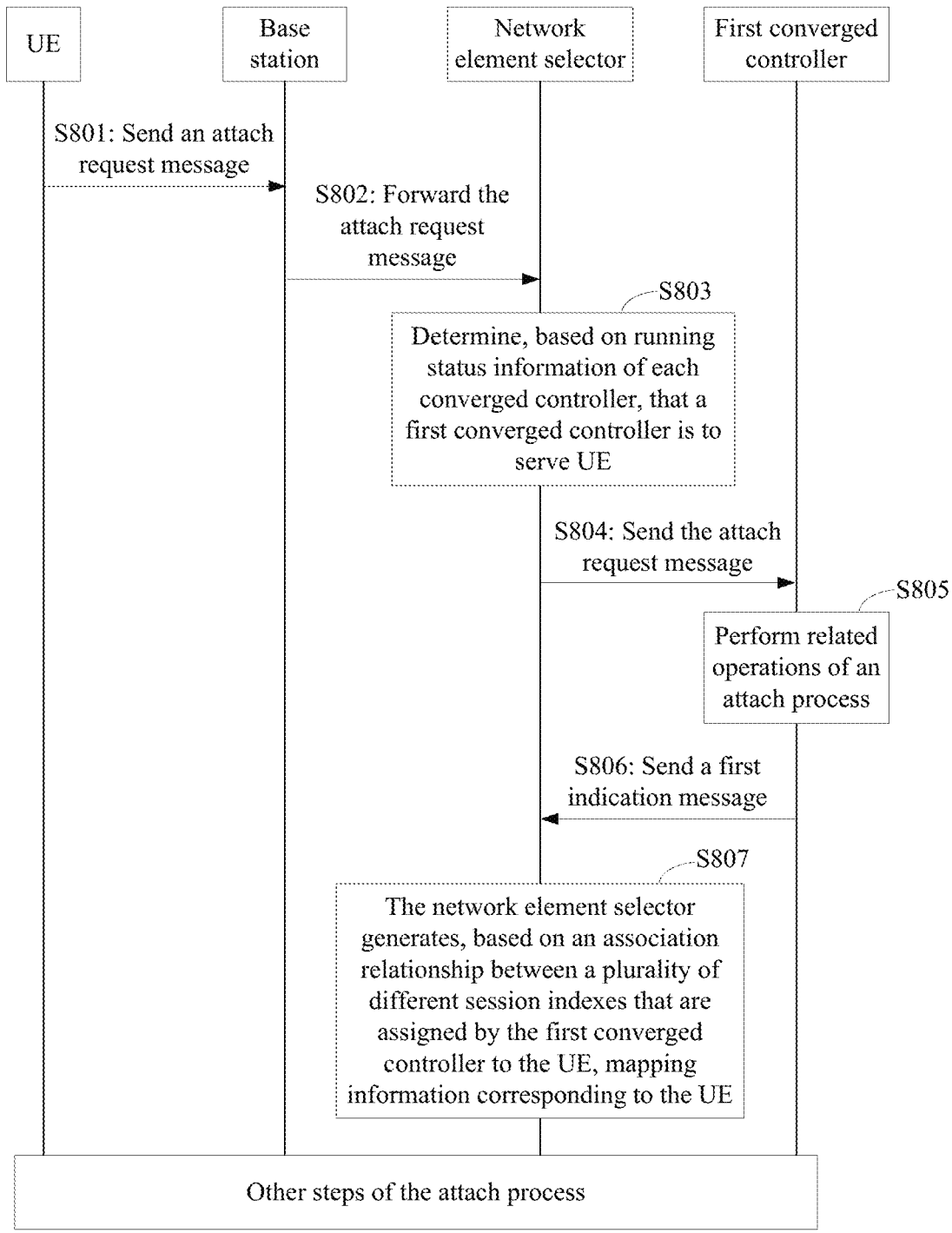
FIG. 8 shows a flowchart of still another embodiment of a converged controller selection method according to this application.

FIG. 8 shows a flowchart of still another embodiment of a converged controller selection method according to this application. On a basis of any of the foregoing embodiments, this embodiment mainly describes in detail a process of generating mapping information corresponding to UE. As shown in FIG. 8, the method according to this embodiment may include the following steps.

S801: UE sends an attach request message to a base station.

S802: The base station forwards the received attach request message sent by the UE to a network element selector.

S803: After receiving the attach request message sent by the base station, the network element selector determines, based on running status information of each converged controller, that a first converged controller is to serve the UE.

Optionally, the base station may be corresponding to the second external network element in the foregoing embodiments, and the attach request message may be corresponding to the second message in the foregoing embodiments.

S804: The network element selector sends the attach request message to the first converged controller.

S805: The first converged controller performs related operations of an attach process.

In this step, after receiving the attach request message, the first converged controller performs the related operations of the attach process. Optionally, the related operations include but are not limited to establishing a PDN connection, assigning an IP address, and the like.

S806: The first converged controller sends a first indication message to the network element selector.

In this step, the first converged controller sends the first indication message to the network element selector. The first indication message is used for establishing mapping information corresponding to the UE, and the first indication message carries an association relationship between a plurality of different session indexes that are assigned by the first converged controller to the UE. For example, the first indication message carries an association relationship between a user GUTI (a session index on a base station side), an IP address (a session index on an AF side) corresponding to a newly established PDN connection, and a user identifier TEID (a session index on a GW-U side) of a user plane. Certainly, the first indication message may further carry other information. This is not limited in this embodiment of this application.

S807: The network element selector generates, based on the association relationship between the plurality of different session indexes that are assigned by the first converged controller to the UE, mapping information corresponding to the UE.

In this step, after receiving the first indication message, the network element selector generates, based on the association relationship between the plurality of different session indexes that are assigned by the first converged controller to the UE, the mapping information corresponding to the UE, so that when the network element selector receives a message that is sent by another external network element and that carries a session index of the UE, the network element selector sends, based on the mapping information corresponding to the UE and the session index of the UE, all messages of different external network elements serving the UE to a same converged controller, thereby ensuring consistent selection of the converged controller.

Further, after the first converged controller performs step S806, and/or the network element selector performs step S807, other steps of the attach process in the prior art may be further performed. This is not limited in this embodiment of this application.

In this embodiment, when the UE initiates the attach process, the network element selector implements initial selection of the converged controller, and forwards, to the selected first converged controller, the attach request message sent by the UE. Further, the first converged controller instructs the network element selector to generate the mapping information corresponding to the UE, so as to ensure that subsequently when other external network elements send messages carrying a session index of the UE to the network element selector, the network element selector sends, based on the mapping information corresponding to the UE and the session index of the UE, all messages of different external network elements serving the UE to the same converged controller, thereby ensuring consistent selection of the converged controller.

Figure 9:
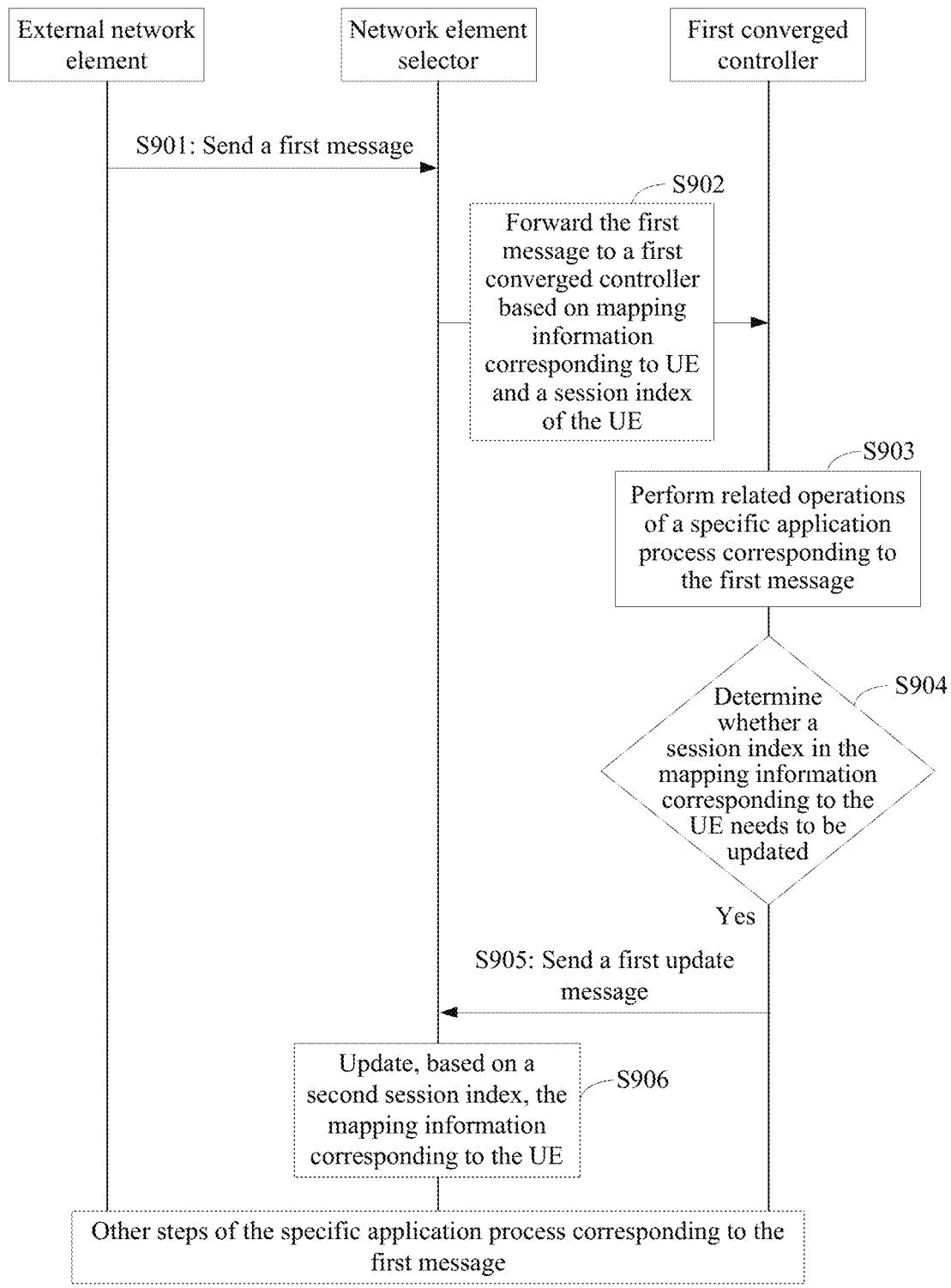
FIG. 9 shows a flowchart of still another embodiment of a converged controller selection method according to this application.

FIG. 9 shows a flowchart of still another embodiment of a converged controller selection method according to this application. On a basis of any of the foregoing embodiments, this embodiment mainly describes in detail a process of updating an association relationship between session indexes of UE. As shown in FIG. 9, the method according to this embodiment may include the following steps.

S901: An external network element (such as a base station, an AF, or a GW-U) sends a first message to a network element selector.

Optionally, the first message carries a session index of UE.

S902: The network element selector forwards the first message to a first converged controller based on mapping information corresponding to UE and a session index of the UE.

S903: The first converged controller receives the first message, and performs related operations of a specific application process corresponding to the first message.

S904: The first converged controller determines whether a session index in the mapping information corresponding to the UE needs to be updated.

In this step, the first converged controller determines whether a session index in the mapping information corresponding to the UE needs to be updated. For example, if the first message is a PDN connection establishment request message, the first converged controller establishes a new PDN connection for the UE, and assigns a new IP address and a user identifier TEID of a new user plane, and the like. If the first converged controller determines that a session index in the mapping information corresponding to the UE needs to be updated, step S905 is performed. If a session index in the mapping information corresponding to the UE does not need to be updated, another related step of the specific application process corresponding to the first message (such as returning a corresponding response message to the external network element) is performed. Alternatively, no operation is performed. This is not limited in this embodiment of this application.

S905: The first converged controller sends a first update message to the network element selector.

Optionally, the first update message is used for updating the mapping information corresponding to the UE, and the first update message carries a second session index. Optionally, the first update message may further carry a before-update old session index, so that the network element selector replaces the before-update old session index with the second session index.

For example, assuming that the first message is a PDN connection establishment request message, the first converged controller establishes a new PDN connection for the UE (such as UE1). That is, the first converged controller assigns a new IP address (such as IP4) and a user identifier TEID (such as TEID5) of a new user plane. Accordingly, the first session index includes IP2 and TEID3 (namely, the old session indexes) before update, and IP4 and TEID5 (namely, new session indexes) after update. Alternatively, assuming that the first message is a PDN connection release message, the first converged controller needs to delete an IP address (such as IP2) and a user identifier TEID (such as TEID3) of a user plane that are corresponding to a PDN connection requested to be released. Accordingly, the first session index includes the to-be-deleted IP address (such as IP2) and the to-be-deleted user identifier TEID (such as TEID3).

S906: The network element selector updates, based on the second session index, the mapping information corresponding to the UE.

Figure 10:
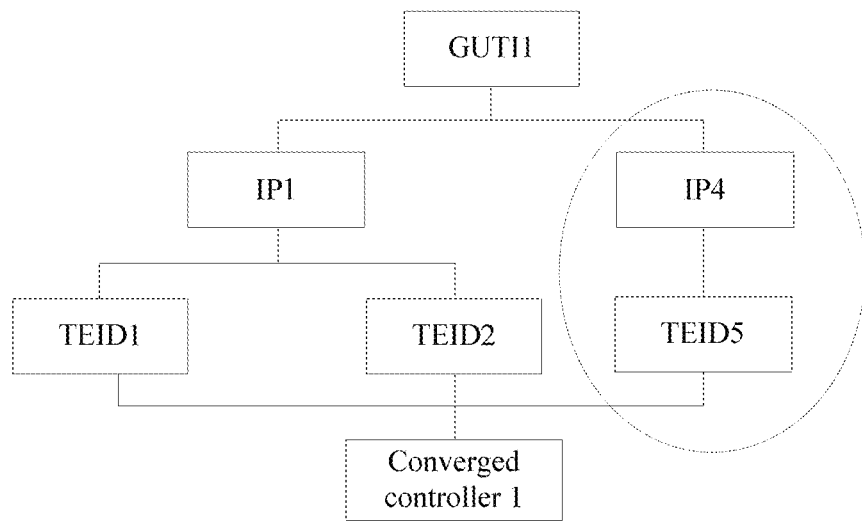
FIG. 10 is a schematic diagram of updated mapping information corresponding to UE1 according to this application.

In this step, after receiving the first update message sent by the first converged controller, the network element selector updates, based on the second session index, the mapping information corresponding to the UE. Optionally, the network element selector uses the second session index to replace an old session index that is already stored in the mapping information corresponding to the UE and that is corresponding to the second session index. For example, assuming that the second session index includes IP2 and TEID3 (namely, the old session indexes) before update, and IP4 and TEID (namely, the new session indexes) after update, the network element selector uses IP4 and TEID to replace IP2 and TEID3 (namely, the old session indexes) that are already stored in mapping information corresponding to UE1 shown in FIG. 4, to form mapping information shown in FIG. 10 (FIG. 10 is a schematic diagram of updated mapping information corresponding to UE1 according to this application). Alternatively, optionally, the network element selector deletes an old session index that is in the mapping information corresponding to the UE and that is corresponding to a to-be-deleted session index included in the second session index. For example, assuming that the second session index includes a to-be-deleted IP address (such as IP2) and a to-be-deleted user identifier TEID (such as TEID3), the network element selector deletes IP2 and TEID3 (namely, the old session indexes) that are already stored in the mapping information corresponding to UE1 shown in FIG. 4.

Optionally, the first update message may alternatively carry the second session index in another form (for example, the first update message carries a plurality of session indexes in the updated mapping information corresponding to the UE), so that the network element selector directly replaces a plurality of session indexes in the old mapping information corresponding to the UE with a plurality of session indexes in the updated mapping information corresponding to the UE. Certainly, the first update message may alternatively carry the second session index in another form. This is not limited in this embodiment of this application.

Further, after the first converged controller performs step S905, and/or the network element selector performs step S906, other steps of the specific application process corresponding to the first message in the prior art may be further performed. This is not limited in this embodiment of this application.

In this embodiment, when a related session index of the UE changes in the application process performed by the first converged controller, the first converged controller needs to send an update message to the network element selector. Further, the network element selector completes updating the mapping information corresponding to the UE, so as to ensure that subsequently when other external network elements send messages carrying a session index of the UE to the network element selector, the network element selector accurately sends, based on the accurate mapping information corresponding to the UE and the session index of the UE, all messages of different external network elements serving the UE to the same converged controller, thereby ensuring consistent selection of the converged controller.

Figure 11:
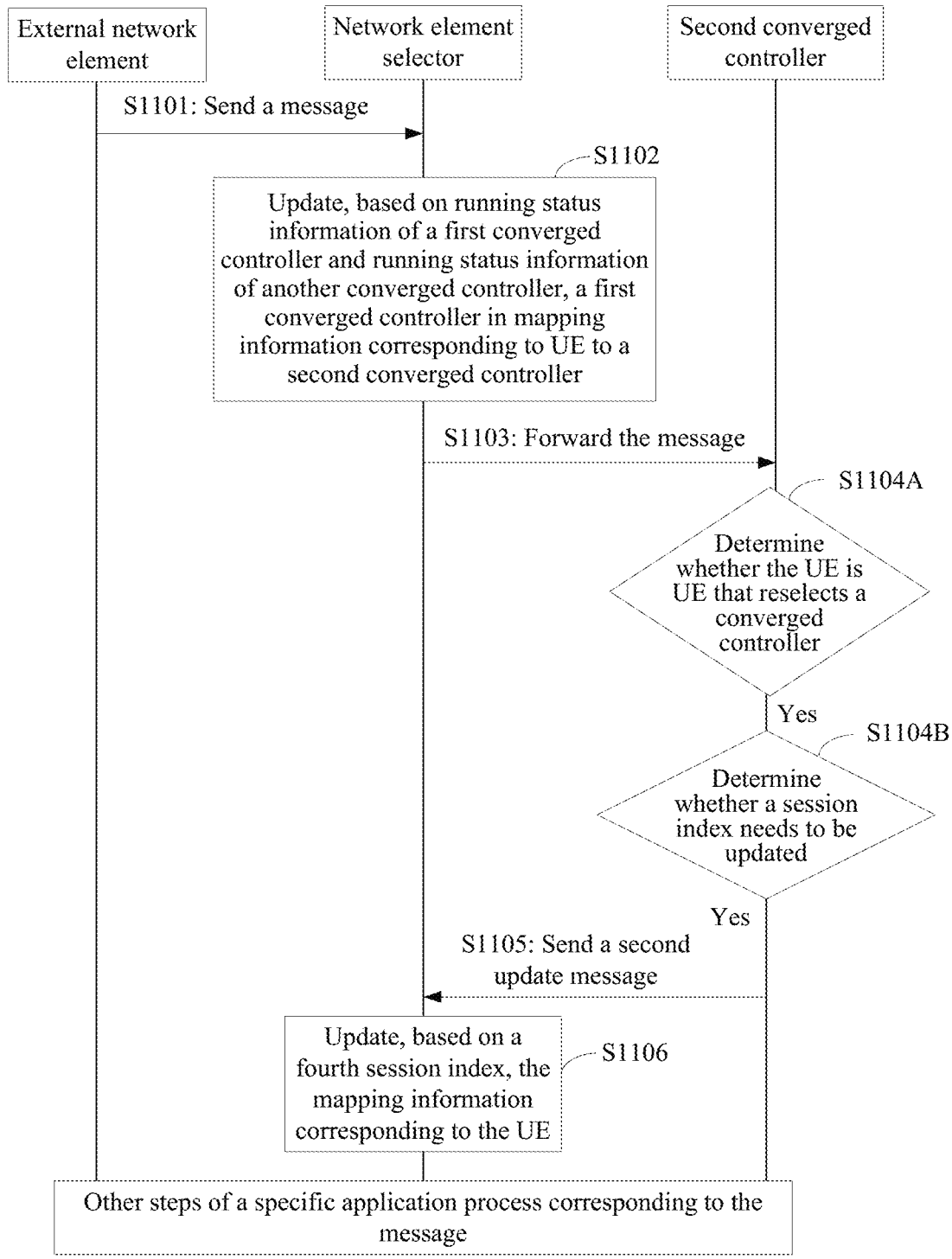
FIG. 11 shows a flowchart of still another embodiment of a converged controller selection method according to this application.

FIG. 11 shows a flowchart of still another embodiment of a converged controller selection method according to this application. On a basis of any of the foregoing embodiments, this embodiment mainly describes in detail an update process of a converged controller in mapping information corresponding to UE. As shown in FIG. 11, the method according to this embodiment may include the following steps.

S1101: An external network element (such as a base station, an AF, or a GW-U) sends a message to a network element selector.

Optionally, an exchange message carries a session index of UE. Optionally, the external network element may be corresponding to the third external network element in the foregoing embodiments, and the message may be corresponding to the third message in the foregoing embodiments.

S1102: The network element selector updates, based on running status information of a first converged controller and running status information of another converged controller, the first converged controller in mapping information corresponding to UE to a second converged controller.

In this step, after receiving the message that is sent by the external network element and that carries a session index of the UE, the network element selector determines, based on the mapping information corresponding to the UE and the session index of the UE, that a converged controller serving the UE is the first converged controller. Further, the network element selector determines, based on the running status information of the first converged controller, whether the converged controller needs to be updated. If the converged controller needs to be updated (for example, load of the first converged controller exceeds a threshold, or the first converged controller is unavailable), the network element selector can determine, based on the running status information of the another converged controller and a preset policy, to update the first converged controller in the mapping information corresponding to the UE to the second converged controller. Optionally, the updated mapping information corresponding to the UE includes a mapping relationship between the second converged controller and a plurality of different session indexes of the UE. Optionally, the preset policy may include: In available converged controllers, a converged controller with minimum load acts as a target converged controller, or a converged controller with a shortest response time acts as the target converged controller. Certainly, the preset policy may further include other policy information. This is not limited in this embodiment of this application.

S1103: The network element selector forwards the message to the second converged controller.

S1104A: The second converged controller determines whether the UE is UE that reselects a converged controller.

In this step, after receiving the message sent by the network element selector, the second converged controller determines whether the UE is UE that reselects a converged controller. If the UE is UE that reselects a converged controller, step S1104B is performed; or if the UE is not UE that reselects a converged controller, another related step (such as returning a corresponding response message to the external network element) of a specific application process corresponding to the message is performed.

S1104B: The second converged controller determines whether a session index needs to be updated.

In this step, the second converged controller determines whether a session index needs to be updated. If it is determined that the session index needs to be updated (for example, if a base station side uses a GUTI as the session index, a GUTI reassignment process may be initiated), step S1105 is performed. If it is determined that the session index does not need to be updated (For example, if an AF side uses an IP address as the session index, when a converged controller is replaced, a new IP address does not need to be reassigned. Alternatively, if the base station side uses the GUTI as the session index, and the GUTI is shared between converged controllers, the GUTI reassignment process does not need to be initiated.), another related step (such as returning a corresponding response message to the external network element) of the specific application process corresponding to the message is performed.

S1105: The second converged controller sends a second update message to the network element selector.

Optionally, the second update message is used for updating the mapping information corresponding to the UE, and the second update message carries a fourth session index (such as an assigned new GUTI).

Optionally, the fourth session index may be sent explicitly or implicitly.

S1106: The network element selector updates, based on the fourth session index, the mapping information corresponding to the UE.

In this step, after receiving the second update message sent by the second converged controller, the network element selector updates, based on the fourth session index, the mapping information corresponding to the UE. Optionally, the network element selector uses the fourth session index to replace an old session index that is already stored in the mapping information corresponding to the UE and that is corresponding to the fourth session index.

Further, after the second converged controller performs step S1105, and/or the network element selector performs step S1106, other steps of the specific application process corresponding to the message in the prior art may be further performed. This is not limited in this embodiment of this application.

In this embodiment, the network element selector stores the updated mapping information corresponding to the UE, so that when the network element selector subsequently receives a message that is sent by another external network element and that contains different session indexes of the UE, the network element selector can still forward the message to the same converged controller based on new mapping information corresponding to the UE, thereby implementing consistent selection of the converged controller.

Figure 12:
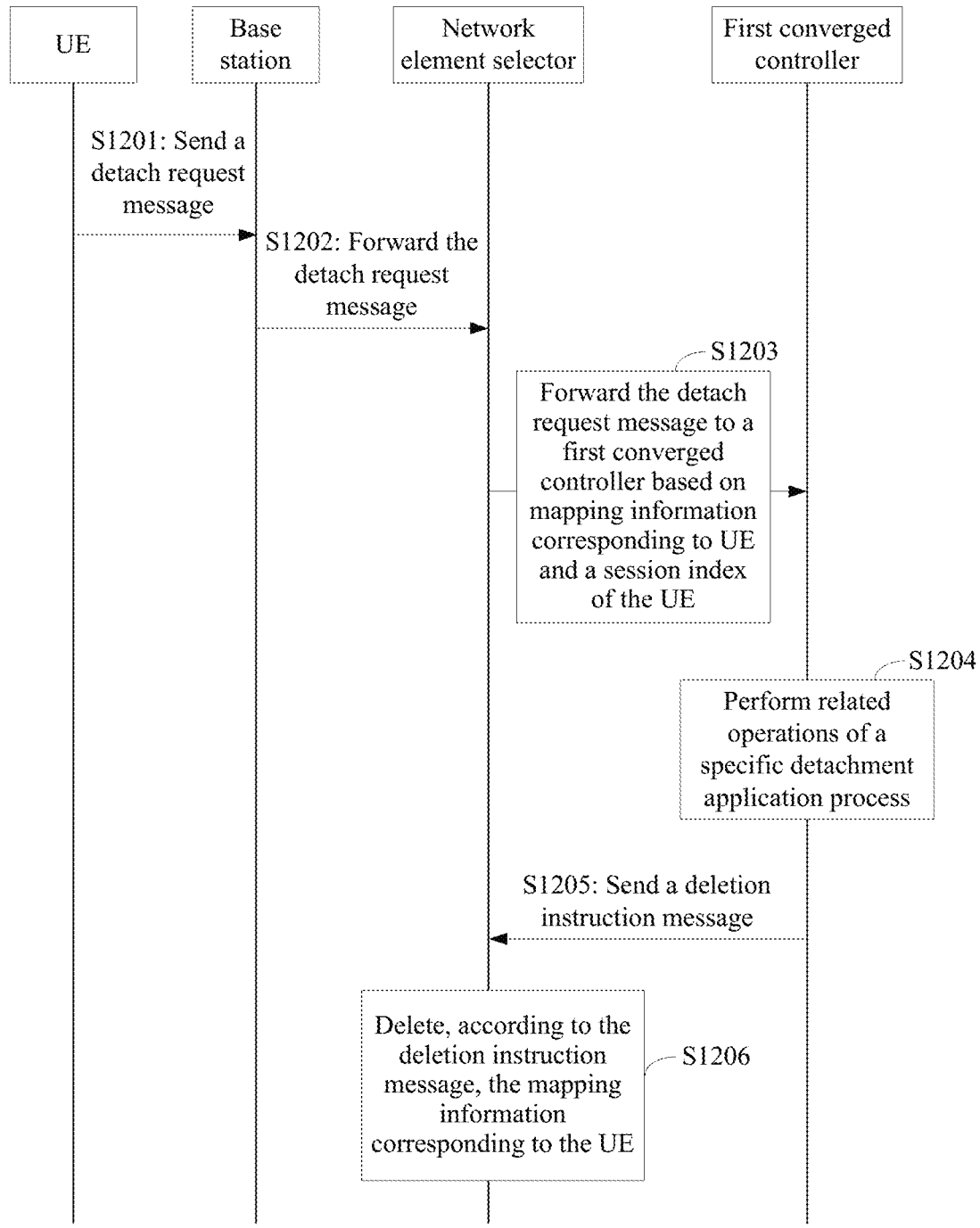
FIG. 12 shows a flowchart of still another embodiment of a converged controller selection method according to this application.

FIG. 12 shows a flowchart of still another embodiment of a converged controller selection method according to this application. On a basis of any of the foregoing embodiments, this embodiment mainly describes in detail a process of deleting mapping information corresponding to UE. As shown in FIG. 12, the method according to this embodiment may include the following steps.

S1201: UE sends a detach request message to a base station.

Optionally, the detach request message includes a session index of the UE.

S1202: The base station forwards the detach request message to a network element selector.

S1203: The network element selector forwards the detach request message to a first converged controller based on mapping information corresponding to the UE and a session index of the UE.

Optionally, the base station may be corresponding to the first external network element in the foregoing embodiments, and the detach request message may be corresponding to the first message in the foregoing embodiments.

S1204: The first converged controller receives the detach request message and performs related operations of a specific detachment application process.

Optionally, the related operations of the specific detachment application process are the same as operations of a specific detachment application process in the prior art. Details are not described in this embodiment of this application. Further, after completing the related operations of the specific detachment application process, the first converged controller performs step S1205.

S1205: The first converged controller sends a deletion instruction message to the network element selector.

Optionally, the deletion instruction message is used for deleting the mapping information corresponding to the UE.

S1206: The network element selector deletes, according to the deletion instruction message, the mapping information corresponding to the UE.

In this embodiment, when the UE initiates a detach process, after receiving the deletion instruction message sent by the first converged controller, the network element selector deletes the mapping information corresponding to the UE, thereby reducing occupation of a storage space by invalid data, and ensuring correctness of subsequent converged controller selection by the network element selector.

Figure 13:
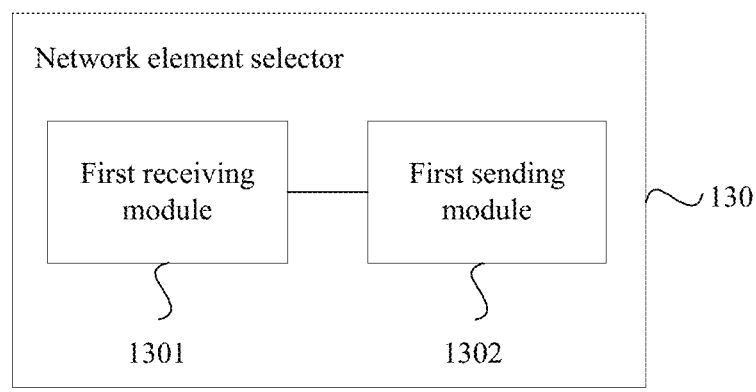
FIG. 13 shows a schematic structural diagram of Embodiment 1 of a network element selector according to this application.

FIG. 13 shows a schematic structural diagram of Embodiment 1 of a network element selector according to this application. As shown in FIG. 13, a network element selector 130 provided in this embodiment includes: a first receiving module 1301, configured to receive a first message from a first external network element, where the first message carries a first session index, and the first session index is used to identify user equipment UE served by the first external network element; and a first sending module 1302, configured to send the first message to a first converged controller based on mapping information corresponding to the UE and the first session index in the first message, where the mapping information includes a mapping relationship between the first converged controller and a plurality of different session indexes of the UE, and the plurality of different session indexes of the UE include the first session index.

Optionally, the network element selector 130 further includes: a second receiving module, configured to receive a second message from a second external network element, where the second message is a message used to provide a service for the UE by the second external network element; and a determining module, configured to: if the second message does not carry a session index of the UE, or if the network element selector does not store the mapping information corresponding to the UE, determine, based on running status information of each converged controller, to send the second message to the first converged controller.

Optionally, the network element selector 130 further includes: a third receiving module, configured to receive a first indication message from the first converged controller, where the first indication message carries an association relationship between the plurality of different session indexes that are assigned by the first converged controller to the UE; and a generation module, configured to generate, based on the association relationship, the mapping information corresponding to the UE.

Optionally, the network element selector 130 further includes: a fourth receiving module, configured to receive a first update message from the first converged controller, where the first update message carries a second session index; and a first update module, configured to update, based on the second session index, the mapping information corresponding to the UE.

Optionally, the network element selector 130 further includes: a fifth receiving module, configured to receive a third message from a third external network element, where the third message is a message used to provide a service for the UE by the third external network element, and the third message carries a third session index; a second update module, configured to update, based on running status information of the first converged controller and running status information of another converged controller, the first converged controller in the mapping information corresponding to the UE to the second converged controller; and a second sending module, configured to send the third message to the second converged controller based on the updated mapping information corresponding to the UE and the third session index.

Optionally, the network element selector 130 further includes: a sixth receiving module, configured to receive a second update message from the second converged controller, where the second update message carries a fourth session index; and a third update module, configured to update, based on the fourth session index, the mapping information corresponding to the UE.

Optionally, the network element selector 130 further includes: a seventh receiving module, configured to receive a deletion instruction message from the first converged controller, where the deletion instruction message is used for deleting the mapping information corresponding to the UE; and a deletion module, configured to delete, according to the deletion instruction message, the mapping information corresponding to the UE.

The network element selector provided in this embodiment can be configured to execute the technical solution about the network element selector in any of the foregoing converged controller selection method embodiments in the present invention. An implementation principle and a technical effect of the network element selector are similar to those of the technical solutions, and details are not described herein again.

Figure 14:
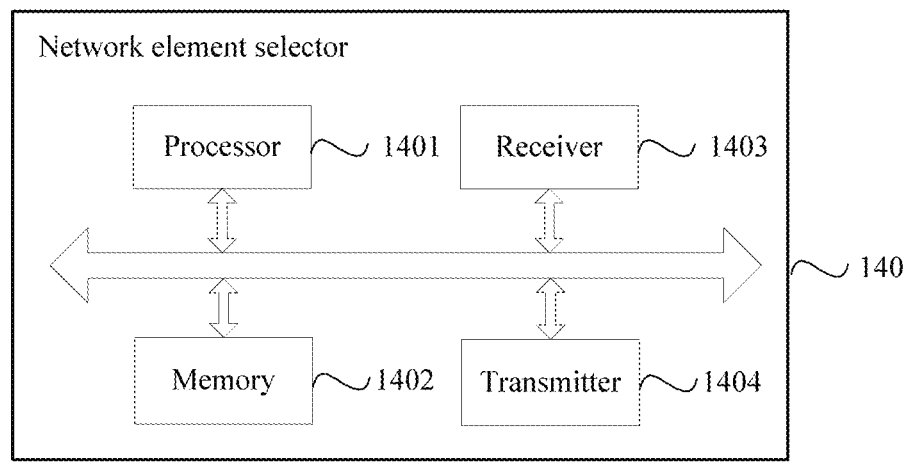
FIG. 14 shows a schematic structural diagram of Embodiment 2 of a network element selector according to this application.

FIG. 14 shows a schematic structural diagram of Embodiment 2 of a network element selector according to this application. As shown in FIG. 14, a network element selector 140 provided in this embodiment may include a processor 1401 and a memory 1402. The network element selector 140 may further include a receiver 1403 and a transmitter 1404. The memory 1402, the receiver 1403, and the transmitter 1404 are all connected to the processor 1401.

The memory 1402 is configured to store an execution instruction. The receiver 1403 is configured to receive a first message from a first external network element, where the first message carries a first session index, and the first session index is used to identify user equipment UE served by the first external network element. The processor 1401 is configured to execute the execution instruction in the memory 1402 to enable the transmitter 1404 to send the first message to a first converged controller based on mapping information corresponding to the UE and the first session index in the first message. The mapping information includes a mapping relationship between the first converged controller and a plurality of different session indexes of the UE, and the plurality of different session indexes of the UE include the first session index.

Optionally, the receiver 1403 is further configured to receive a second message from a second external network element, where the second message is a message used to provide a service for the UE by the second external network element; and the processor 1401 is further configured to: if the second message does not carry a session index of the UE, or if the network element selector does not store the mapping information corresponding to the UE, determine, based on running status information of each converged controller, to send the second message to the first converged controller.

Optionally, the receiver 1403 is further configured to receive a first indication message from the first converged controller, where the first indication message carries an association relationship between the plurality of different session indexes that are assigned by the first converged controller to the UE; and the processor 1401 is further configured to generate, based on the association relationship, the mapping information corresponding to the UE.

Optionally, the receiver 1403 is further configured to receive a first update message from the first converged controller, where the first update message carries a second session index; and the processor 1401 is further configured to update, based on the second session index, the mapping information corresponding to the UE.

Optionally, the receiver 1403 is further configured to receive a third message from a third external network element, where the third message is a message used to provide a service for the UE by the third external network element, and the third message carries a third session index; the processor 1401 is further configured to update, based on running status information of the first converged controller and running status information of another converged controller, the first converged controller in the mapping information corresponding to the UE to the second converged controller; and the transmitter 1404 is further configured to send the third message to the second converged controller based on the updated mapping information corresponding to the UE and the third session index.

Optionally, the receiver 1403 is further configured to receive a second update message from the second converged controller, where the second update message carries a fourth session index; and the processor 1401 is further configured to update, based on the fourth session index, the mapping information corresponding to the UE.

Optionally, the receiver 1403 is further configured to receive a deletion instruction message from the first converged controller, where the deletion instruction message is used for deleting the mapping information corresponding to the UE; and the processor 1401 is further configured to delete, according to the deletion instruction message, the mapping information corresponding to the UE.

The network element selector provided in this embodiment can be configured to execute the technical solution about the network element selector in any of the foregoing converged controller selection method embodiments in the present invention. An implementation principle and a technical effect of the network element selector are similar to those of the technical solutions, and details are not described herein again.

In Embodiment 3 of a network element selector according to this application, the network element selector includes: a receiving module, configured to receive an operation instruction message from a converged controller, where the operation instruction message carries an association relationship between a plurality of different session indexes that are assigned by the controller to user equipment UE; and a generation module, configured to generate, based on the association relationship, mapping information corresponding to the UE, where the mapping information corresponding to the UE includes a mapping relationship between the converged controller and the plurality of different session indexes of the UE.

The network element selector provided in this embodiment can be configured to execute the technical solutions in the foregoing mapping information generation method embodiment in the present invention. An implementation principle and a technical effect of the network element selector are similar to those of the technical solutions, and details are not described herein again.

In Embodiment 4 of a network element selector according to this application, the network element selector includes a processor, a memory, and a transceiver.

The memory is configured to store an execution instruction. The transceiver is configured to receive an operation instruction message from a converged controller, where the operation instruction message carries an association relationship between a plurality of different session indexes that are assigned by the controller to user equipment UE. The processor is configured to execute the execution instruction in the memory, so as to generate, based on the association relationship, mapping information corresponding to the UE, where the mapping information corresponding to the UE includes a mapping relationship between the converged controller and the plurality of different session indexes of the UE.

The network element selector provided in this embodiment can be configured to execute the technical solutions in the foregoing mapping information generation method embodiment in the present invention. An implementation principle and a technical effect of the network element selector are similar to those of the technical solutions, and details are not described herein again.

Figure 15:
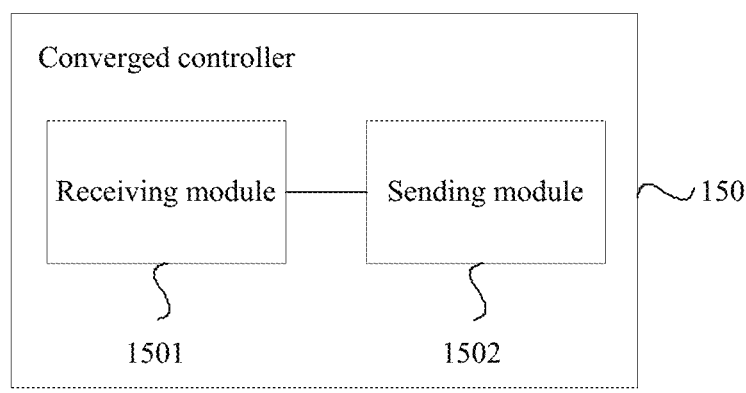
FIG. 15 shows a schematic structural diagram of Embodiment 1 of a converged controller according to this application.

FIG. 15 shows a schematic structural diagram of Embodiment 1 of a converged controller according to this application. As shown in FIG. 15, a converged controller 150 provided in this embodiment includes: a receiving module 1501, configured to receive a message from a network element selector, where the message is a message sent by an external network element to the network element selector for providing a service for user equipment UE; and a sending module 1502, configured to send an operation instruction message to the network element selector based on the message, where the operation instruction message is used for generating, updating, or deleting mapping information corresponding to the UE, and the mapping information corresponding to the UE includes a mapping relationship between the first converged controller and a plurality of different session indexes of the UE.

Optionally, the operation instruction message carries an association relationship between the plurality of different session indexes that are assigned by the converged controller to the UE.

Optionally, the converged controller 150 further includes: a judging module, configured to determine whether a session index in the mapping information corresponding to the UE needs to be updated, where if the judging module determines that a session index in the mapping information corresponding to the UE needs to be updated, the operation instruction message carries the to-be-updated session index in the plurality of different session indexes in the mapping information.

Optionally, the operation instruction message is used for deleting the mapping information corresponding to the UE.

The converged controller provided in this embodiment can be configured to execute the technical solutions about the first converged controller in any of the foregoing converged controller selection method embodiments in the present invention. An implementation principle and a technical effect of the converged controller are similar to those of the technical solutions, and details are not described herein again.

Figure 16:
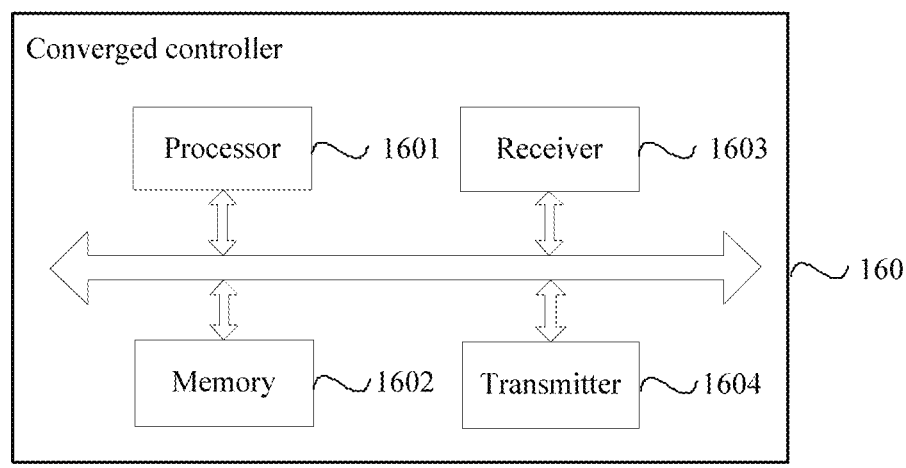
FIG. 16 shows a schematic structural diagram of Embodiment 2 of a converged controller according to this application.

FIG. 16 shows a schematic structural diagram of Embodiment 2 of a converged controller according to this application. As shown in FIG. 16, a converged controller 160 provided in this embodiment may include a processor 1601 and a memory 1602. The converged controller 160 may further include a receiver 1603 and a transmitter 1604. The memory 1602, the receiver 1603, and the transmitter 1604 are all connected to the processor 1601.

The memory 1602 is configured to store an execution instruction. The receiver 1603 is configured to receive a message from a network element selector, where the message is a message sent by an external network element to the network element selector for providing a service for user equipment UE. The processor 1601 is configured to execute the execution instruction in the memory 1602 to enable the transmitter 1604 to send an operation instruction message to the network element selector based on the message, where the operation instruction message is used for generating, updating, or deleting mapping information corresponding to the UE, and the mapping information corresponding to the UE includes a mapping relationship between the first converged controller and a plurality of different session indexes of the UE.

Optionally, the operation instruction message carries an association relationship between the plurality of different session indexes that are assigned by the converged controller to the UE.

Optionally, the processor 1601 is further configured to determine whether a session index in the mapping information corresponding to the UE needs to be updated, where if the processor 1601 determines that a session index in the mapping information corresponding to the UE needs to be updated, the operation instruction message carries the to-be-updated session index in the plurality of different session indexes in the mapping information.

Optionally, the operation instruction message is used for deleting the mapping information corresponding to the UE.

The converged controller provided in this embodiment can be configured to execute the technical solutions about the first converged controller in any of the foregoing converged controller selection method embodiments in the present invention. An implementation principle and a technical effect of the converged controller are similar to those of the technical solutions, and details are not described herein again.

Figure 17:
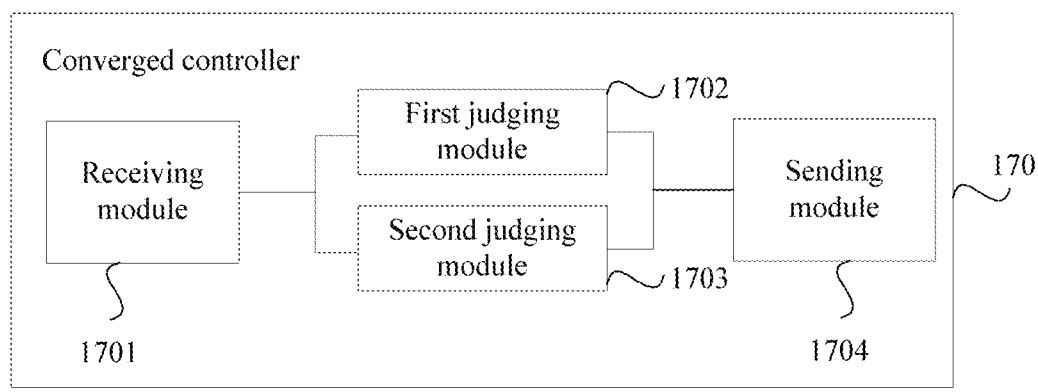
FIG. 17 shows a schematic structural diagram of Embodiment 3 of a converged controller according to this application.

FIG. 17 shows a schematic structural diagram of Embodiment 3 of a converged controller according to this application. As shown in FIG. 17, a converged controller 170 provided in this embodiment includes: a receiving module 1701, configured to receive a message from a network element selector, where the message is a message sent by an external network element to the network element selector for providing a service for user equipment UE; a first judging module 1702, configured to determine whether the UE is UE that reselects a converged controller; a second judging module 1703, configured to determine whether a session index in mapping information corresponding to the UE needs to be updated; and a sending module 1704, configured to: if the first judging module 1702 determines that the UE is UE that reselects a converged controller, and the second judging module 1703 determines that a session index in the mapping information corresponding to the UE needs to be updated, send an update message to the network element selector, where the update message is used for updating the mapping information corresponding to the UE, the mapping information corresponding to the UE includes a mapping relationship between the converged controller and a plurality of different session indexes of the UE, and the update message carries the to-be-updated session index in the plurality of different session indexes in the mapping information.

The converged controller provided in this embodiment can be configured to execute the technical solutions about the second converged controller in any of the foregoing converged controller selection method embodiments in the present invention. An implementation principle and a technical effect of the converged controller are similar to those of the technical solutions, and details are not described herein again.

Figure 18:
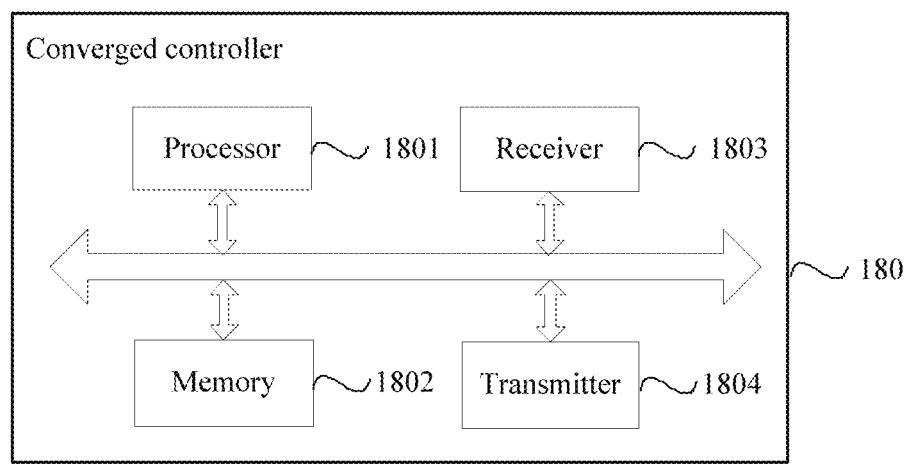
FIG. 18 shows a schematic structural diagram of Embodiment 4 of a converged controller according to this application.

FIG. 18 shows a schematic structural diagram of Embodiment 4 of a converged controller according to this application. As shown in FIG. 18, a converged controller 180 provided in this embodiment may include a processor 1801 and a memory 1802. The converged controller 180 may further include a receiver 1803 and a transmitter 1804. The memory 1802, the receiver 1803, and the transmitter 1804 are all connected to the processor 1801.

The memory 1802 is configured to store an execution instruction. The receiver 1803 is configured to receive a message from a network element selector, where the message is a message sent by an external network element to the network element selector for providing a service for user equipment UE. The processor 1801 is configured to execute the execution instruction in the memory 1802 to determine whether the UE is UE that reselects a converged controller and determine whether a session index in mapping information corresponding to the UE needs to be updated. The transmitter 1604 is configured to: if the processor 1801 determines that the UE is UE that reselects a converged controller, and the processor 1801 determines that a session index in the mapping information corresponding to the UE needs to be updated, send an update message to the network element selector, where the update message is used for updating the mapping information corresponding to the UE, the mapping information corresponding to the UE includes a mapping relationship between the converged controller and a plurality of different session indexes of the UE, and the update message carries the to-be-updated session index in the plurality of different session indexes in the mapping information.

The converged controller provided in this embodiment can be configured to execute the technical solutions about the second converged controller in any of the foregoing converged controller selection method embodiments in the present invention. An implementation principle and a technical effect of the converged controller are similar to those of the technical solutions, and details are not described herein again.

In an embodiment of a converged controller selection system provided in this application, the system includes a network element selector and a converged controller. The network element selector may be of a structure of the foregoing network element selector Embodiment 1 or Embodiment 2, and correspondingly, can execute the technical solution about the network element selector in any of the foregoing converged controller selection method embodiments. The converged controller may be of a structure of the foregoing converged controller Embodiment 1 or Embodiment 2, and correspondingly, can execute the technical solution about the first converged controller in any of the foregoing converged controller selection method embodiments. An implementation principle and a technical effect of the network element selector or the converged controller are similar to those of the technical solutions, and details are not described herein again.

Optionally, the converged controller selection system further includes a converged controller of a structure described in the foregoing converged controller Embodiment 3 and Embodiment 4, and correspondingly, can execute the technical solutions about the second converged controller in any of the foregoing converged controller selection method embodiments. An implementation principle and a technical effect of the converged controller are similar to those of the technical solutions, and details are not described herein again.

In the several embodiments provided in this application, it should be understood that the disclosed apparatus and method may be implemented in other manners. For example, the foregoing described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit. The foregoing integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor (processor) to perform some of the steps of the methods described in the embodiments of the present invention.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing apparatus, reference may be made to a corresponding process in the foregoing method embodiments, and details are not described herein again.

A person of ordinary skill in the art may understand that various numbers such as "first" and "second" in this specification are only used for differentiation for ease of description, but are not used to limit the scope of the embodiments of the present invention.

A person of ordinary skill in the art may understand that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may understand that all or some of the steps of the method embodiments may be implemented by a program instructing relevant hardware. The program may be stored in a computer readable storage medium. When the program is executed, the steps of the method embodiments are performed. The foregoing storage medium includes any medium that can store program code, such as a read-only memory (Read-Only Memory, ROM for short), a random access memory (Random Access Memory, RAM for short), a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method, comprising:
    receiving, by a network element selector, a first message from a first external network element, wherein the first message carries a first session index, and the first session index identifies a user equipment (UE) served by the first external network element;
    sending, by the network element selector, the first message to a first converged controller based on mapping information corresponding to the UE and the first session index carried in the first message, wherein the mapping information comprises a mapping relationship between the first converged controller and a plurality of different session indexes of the UE, and the plurality of different session indexes of the UE comprises the first session index;
    receiving, by the network element selector, a third message from a third external network element, wherein the third message is used to provide a service for the UE by the third external network element, and the third message carries a third session index;

updating, by the network element selector based on running status information of the first converged controller and running status information of a second converged controller of a plurality of converged controllers, the mapping information by updating the first converged controller in the mapping information corresponding to the UE to the second converged controller; and sending, by the network element selector, the third message to the second converged controller based on the updated mapping information corresponding to the UE and the third session index.

2. The method according to claim 1, wherein the method further comprises:
before the receiving the first message from the first external network element:
receiving, by the network element selector, a second message from a second external network element, wherein the second message is used to provide a service for the UE by the second external network element; and
when the second message does not carry any session index of the UE, or when the network element selector does not store the mapping information corresponding to the UE, determining, by the network element selector based on running status information of each converged controller of the plurality of converged controllers, to send the second message to the first converged controller, wherein the plurality of converged controllers comprises the first converged controller.

3. The method according to claim 2, wherein the method further comprises:
after the determining, by the network element selector based on the running status information of the each converged controller of the plurality of converged controllers, to send the second message to the first converged controller:
receiving, by the network element selector, a first indication message from the first converged controller, wherein the first indication message carries an association relationship between the plurality of different session indexes that are assigned by the first converged controller to the UE; and
generating, by the network element selector based on the association relationship, the mapping information corresponding to the UE.

4. The method according to claim 1, wherein the method further comprises:
after the sending the third message to the second converged controller based on the updated mapping information corresponding to the UE and the third session index:
receiving, by the network element selector, a second update message from the second converged controller, wherein the second update message carries a fourth session index; and
updating, by the network element selector based on the fourth session index, the updated mapping information corresponding to the UE.

5. A network element selector, comprising:
at least one processor;
a receiver, configured to receive a first message from a first external network element, wherein the first message carries a first session index, and the first session index identifies a user equipment (UE) served by the first external network element; and
a transmitter, configured to send the first message to a first converged controller based on mapping information corresponding to the UE and the first session index carried in the first message, wherein the mapping information corresponding to the UE comprises a mapping relationship between the first converged controller and a plurality of different session indexes of the UE, and wherein the plurality of different session indexes of the UE comprises the first session index;
wherein the receiver is further configured to:
receive a third message from a third external network element, wherein the third message is used to provide a service for the UE by the third external network element, and the third message carries a third session index,
wherein the at least one processor is configured to:
update, based on running status information of the first converged controller and running status information of a second converged controller of a plurality of converged controllers, the mapping information by updating the first converged controller in the mapping information corresponding to the UE to the second converged controller, and
wherein the transmitter is further configured to send the third message to the second converged controller based on the updated mapping information corresponding to the UE and the third session index.

6. The network element selector according to claim 5:
wherein the receiver is further configured to receive a second message from a second external network element, wherein the second message is used to provide a service for the UE by the second external network element, and
wherein the at least one processor is further configured to:
when the second message does not carry any session index of the UE, or when the network element selector does not store the mapping information corresponding to the UE, determine, based on running status information of each converged controller of the plurality of converged controllers, to send the second message to the first converged controller, wherein the plurality of converged controllers comprises the first converged controller.

7. The network element selector according to claim 6, wherein the receiver is further configured to receive a first indication message from the first converged controller, wherein the first indication message carries an association relationship between the plurality of different session indexes that are assigned by the first converged controller to the UE, and
wherein the at least one processor is further configured to generate, based on the association relationship, the mapping information corresponding to the UE.

8. The network element selector according to claim 6, wherein the receiver is further configured to receive a second update message from the second converged controller, wherein the second update message carries a fourth session index, and
wherein the processor is further configured to update, based on the fourth session index, the updated mapping information corresponding to the UE.

* * * * *